(12) United States Patent
Choi et al.

(10) Patent No.: US 12,327,661 B2
(45) Date of Patent: Jun. 10, 2025

(54) TRANSPARENT CONDUCTOR INCLUDING NANOSTRUCTURE AND MANUFACTURING METHOD THEREOF

(71) Applicant: KOREA INSTITUTE OF MACHINERY & MATERIALS, Daejeon (KR)

(72) Inventors: Dae-Guen Choi, Daejeon (KR); Hyuk Jun Kang, Daejeon (KR); Ji Hye Lee, Daejeon (KR); Junhyuk Choi, Daejeon (KR); Won Seok Chang, Daejeon (KR); Joo Yun Jung, Daejeon (KR); Jun-ho Jeong, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 17/772,295

(22) PCT Filed: Mar. 17, 2021

(86) PCT No.: PCT/KR2021/003298
§ 371 (c)(1),
(2) Date: Apr. 27, 2022

(87) PCT Pub. No.: WO2021/187888
PCT Pub. Date: Sep. 23, 2021

(65) Prior Publication Data
US 2024/0145118 A1    May 2, 2024

(30) Foreign Application Priority Data

Mar. 17, 2020 (KR) .......... 10-2020-0032846
Apr. 9, 2020 (KR) .......... 10-2020-0043428

(51) Int. Cl.
*H01B 5/14* (2006.01)
*H01B 13/00* (2006.01)

(52) U.S. Cl.
CPC .......... *H01B 5/14* (2013.01); *H01B 13/0036* (2013.01)

(58) Field of Classification Search
CPC .......... H01B 5/14; H01B 13/0036
(Continued)

(56) References Cited

U.S. PATENT DOCUMENTS

| 2001/0008717 A1* | 7/2001 | Iijima | ........... C23C 24/02 427/407.1 |
| 2008/0230120 A1* | 9/2008 | Reddy | ........... H10K 30/35 136/265 |
| 2015/0158268 A1* | 6/2015 | Koike | ........... B32B 3/30 156/247 |

FOREIGN PATENT DOCUMENTS

| JP | 2014-046622 | 3/2014 |
| KR | 10-2009-0057060 | 6/2009 |

(Continued)

OTHER PUBLICATIONS

Translation (Year: 2016).*
Translation—KR20160071542-A; Seoul Nat Univ R&DB Foundation; Jul. 6, 2018 (Year: 2018).*

*Primary Examiner* — Katherine A Christy
(74) *Attorney, Agent, or Firm* — LEX IP MEISTER, PLLC

(57) ABSTRACT

A transparent conductor according to an exemplary embodiment of the present invention includes a transparent substrate, and a transparent conductive pattern formed on the transparent substrate, and the transparent conductor includes a nanostructure on an upper surface of at least one of the transparent substrate and the transparent conductive pattern.

3 Claims, 28 Drawing Sheets

(58) Field of Classification Search
USPC .......................................................... 428/701
See application file for complete search history.

(56) References Cited

FOREIGN PATENT DOCUMENTS

| KR | 10-2014-0021035 | | 2/2014 | |
|----|----|----|----|----|
| KR | 10-2015-0014857 | | 2/2015 | |
| KR | 10-2015-0016119 | | 2/2015 | |
| KR | 10-2016-0032218 | | 3/2016 | |
| KR | 1020160071542 | * | 6/2016 | ............. G06F 3/041 |
| KR | 10-2018-0076705 | | 7/2018 | |
| KR | 20160071542 A | * | 7/2018 | |

* cited by examiner

S900

S960

S1400

S1440

S1600

S1640

TRANSPARENT CONDUCTOR INCLUDING NANOSTRUCTURE AND MANUFACTURING METHOD THEREOF

TECHNICAL FIELD

The present invention relates to a transparent conductor including a nanostructure and a manufacturing method thereof. More particularly, the present invention relates to a transparent conductor including a nanostructure including nanostructured surface protrusions and depressions or nanopillars, and a manufacturing method thereof.

BACKGROUND ART

Indium tin oxide (ITO) has been widely used as a material for transparent electrodes of various electronic products. However, ITO has a limitation to physical flexibility in bending or folding, and indium, which is a constituent element of the material, is an expensive and scarce resource. Due to such issues, an effort to develop an alternative material has been continuing.

To date, metal nanomaterials such as metal mesh and metal nanowires, carbon nanomaterials such as carbon nanotube (CNT), graphene, and the like have been proposed as alternative materials for ITO. Among the above materials, a metal mesh form is a widely used form due to various merits such as flexibility and the like. However, the metal mesh form is made of a metal wire with a size of several micrometers or more, and thus there is a lot of empty space between micro metals. A nano metal wire and a carbon material can be coated at a nano level, and thus can be used as a main electrode. However, there is a short-coming such as poor conductivity itself.

In addition, an electrode that is in the metal mesh form through patterning of a metal with high conductivity has been mainly limited to have a structure with a smooth surface. There are devices that have a structure with a flat and smooth surface. Conversely, in some cases, it is advantageous for some devices to have an electrode structure having a surface protrusion-depression structure (or a structure including nanopillars or nanoholes) with a relatively large surface area. A representative example is a use of a catalyst electrode of an electrochemical cell, a photoelectrochemical catalyst, or the like used for hydrogen production or water separation. In addition, an electrode structure or porous electrode structure having nanostructured surface protrusions and depressions or including nanopillars or nanoholes on a surface thereof have various merits. However, a manufacturing method is not well known or uses a complex and expensive process in most cases.

DISCLOSURE

Technical Problem

An aspect of the present specification provides a transparent conductor with an increased surface area by using a nanostructure.

Another aspect of the present specification provides a transparent conductor with improved light transmittance by using a nanostructure.

An exemplary object of the present specification is to provide a transparent conductor capable of improving photoelectric transformation efficiency by improving an electron transport capability.

Another exemplary object of the present specification is to provide a method of efficiently manufacturing a transparent conductor by using a nanostructure.

A technical object to be achieved by a transparent conductor and a manufacturing method thereof according to the technical idea of the technology disclosed in the present specification is not limited to the objects for solving the above-mentioned problems, and other objects not mentioned will be clearly understood by those skilled in the art from the following description.

Technical Solution

A transparent conductor according to an exemplary embodiment of the present invention includes a transparent substrate, and a transparent conductive pattern formed on the transparent substrate, and the transparent conductor includes a nanostructure on an upper surface of at least one of the transparent substrate and the transparent conductive pattern.

The transparent conductor may further include a transparent transfer layer formed on the transparent substrate, and the transparent conductive pattern may be formed on the transparent transfer layer, and the transparent conductive pattern may include a nanostructure on an upper surface thereof.

The transparent conductive pattern may be embedded in an upper portion of the transparent transfer layer, and the transparent conductor may include a nanostructure an upper surface of the transparent transfer layer.

The transparent conductor may further include a conductive layer coated on an upper surface of the transparent transfer layer.

The transparent conductor may further include a conductive layer coated on the upper surface of the transparent conductive pattern.

The transparent substrate may include a nanostructure on an upper surface thereof, and the transparent conductor may further include a conductive layer coated on at least one of the upper surface of the transparent substrate on which the nanostructure is formed and an upper surface of the transparent conductor.

A transparent conductor according to an exemplary embodiment of the present invention includes a transparent substrate, a nanostructure portion formed on the transparent substrate, the nanostructure portion including a plurality of nanopillars or a plurality of nanoholes, and a transparent conductive layer formed on the nanostructure portion.

The transparent conductor may include a transparent conductive pattern portion on which the transparent conductive layer is patterned.

A height of the nanostructure portion may be greater than a height of the transparent conductive layer.

A height of the nanostructure portion may be equal to a height of the transparent conductive layer.

A height of the nanostructure portion may be less than a height of the transparent conductive layer.

The transparent conductor may further include a conductive layer coated on the transparent conductive layer.

The transparent conductive layer may include a transparent conductive portion formed entirely on the nanostructure portion.

The transparent conductive layer may further include a transparent transfer layer formed on the transparent substrate, and the nanostructure portion may be formed on the transparent transfer layer.

A manufacturing method of a transparent conductor according to an exemplary embodiment of the present invention includes forming a nanostructure on an upper surface of a first substrate, coating a transparent conductive layer on the first substrate on which the nanostructure is formed, and forming a transparent conductive pattern by selectively patterning the transparent conductive layer.

The manufacturing method may further include placing a second substrate including a transparent transfer layer on the first substrate, and then transferring the transparent transfer layer onto the first substrate on which the transparent conductive pattern is formed, and separating the first substrate, and the second substrate may be made of a transparent material.

The manufacturing method may further include coating a conductive layer on the transparent conductor after the separating of the first substrate.

The coating of the conductive layer may include selectively coating the conductive layer only on the transparent transfer layer.

The manufacturing method may further include placing a second substrate including a transparent transfer layer on the transparent conductive pattern, and then transferring the transparent transfer layer onto the transparent conductive pattern, and separating the first substrate, and the second substrate may be made of a transparent material.

The manufacturing method may further include coating a conductive layer on the transparent conductor.

The manufacturing method may include coating a conductive layer on the first substrate on which the nanostructure is formed after the forming of the nanostructure on the upper surface of the first substrate.

The manufacturing method may include coating a conductive layer on the first substrate on which the transparent conductive pattern is formed after the forming of the transparent conductive pattern by selectively patterning the transparent conductive layer.

A manufacturing method of a transparent conductor according to an exemplary embodiment of the present invention includes forming a nanostructure portion including a plurality of nanopillars or a plurality of nanoholes on a first substrate, and coating a transparent conductive layer on the first substrate on which the nanostructure portion is formed, and a height of the nanostructure portion is greater than a height of the transparent conductive pattern portion.

The manufacturing method may further include etching the nanostructure portion.

The manufacturing method may further include placing a second substrate including a transparent transfer layer on the first substrate, and then transferring the transparent transfer layer onto the first substrate on which the transparent conductive layer is formed, and separating the first substrate, and the second substrate may be made of a transparent material.

The manufacturing method may further include forming a transparent conductive pattern portion by selectively patterning the transparent conductive layer.

The manufacturing method may further include coating a conductive layer on the transparent conductor.

Advantageous Effects

A transparent conductor according to an exemplary embodiment of the present invention may have a nanostructure formed on a lower portion of the conductor, thereby increasing a contact area with a substrate when an electrode is used, and improving light transmittance.

In addition, a transparent conductor according to an exemplary embodiment of the present invention may have a nanostructure formed on an upper portion of the conductor, thereby improving adherence between an electrode and an active material or semiconductor material on the electrode, and improving efficiency of a device due to an increase in the contact area.

In addition, a transparent conductor according to an exemplary embodiment of the present invention may effectively prevent quenching of an exciton, thereby implementing a device with high efficiency and a long lifespan.

In addition, a transparent conductor according to an exemplary embodiment of the present invention may have a nanostructure passing through a transparent conductive layer to allow a transparent window to be formed inside the conductive layer, thereby improving the light transmittance when the electrode is used, and to allow the nanostructure to support the transparent conductive layer, thereby improving adherence between a conductive material and the substrate.

In addition, a transparent conductor according to an exemplary embodiment of the present invention may have a nanostructure with a superhydrophobic characteristic to allow the conductive material to be selectively coated only on the transparent conductive layer, thereby efficiently manufacturing the conductor.

In addition, a transparent conductor according to an exemplary embodiment of the present invention may have a plurality of nanoholes formed in the entire conductor to allow a surface area of the conductor itself to be increased, thereby improving the light transmittance when the electrode is used.

However, effects according to an exemplary embodiment of the technology disclosed in the present specification are not limited to those mentioned above, and other effects not mentioned will be clearly understood by those skilled in the art from the following description.

MODE FOR INVENTION

Figure 1:
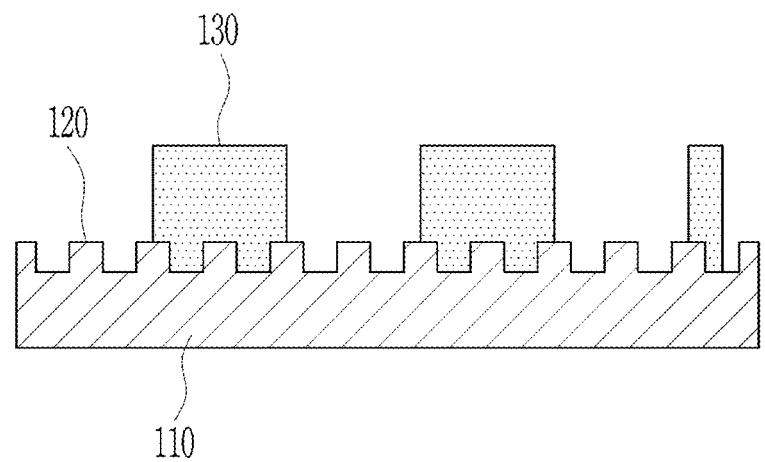
FIGS. 1 to 9 are diagrams illustrating cross-sections of a transparent conductor according to an exemplary embodiment of the present invention.

The technology disclosed in the present specification may have various changes, and may have various exemplary embodiments, and specific exemplary embodiments will be described in detail below with reference to the drawings. However, it should be understood that those exemplary embodiments are not intended to limit the technology disclosed in the present specification to specific implementations, and that the technology disclosed in the present specification includes all modifications, equivalents, or substitutes included in the spirit and scope of the technology disclosed in the present specification.

In describing the technology disclosed in the present specification, if it is determined that a detailed description of a related known technology will be omitted when it is deemed that such description will unnecessarily obscure the gist of the technology disclosed in the present specification. In addition, numbers (for example, first, second, and the like) used in the the specification are intended to merely distinguish one constituent element from another constituent element.

In this specification, when a constituent element is referred to as being "connected" or "coupled" to another constituent element, the two constituent elements may be directly connected or coupled to each other. Unless specifically stated to the contrary, it will be understood that the two constituent elements may be connected or coupled to each other via another new constituent element.

In the present specification, regarding an constituent element with a suffix such as "unit", two or more constituent elements may be combined into one constituent element or one constituent element may be divided into two or more constituent elements according to functions. In addition, each of respective constituent elements to be described below may additionally perform some or all functions among functions which other constituent elements take charge of in addition to a primary function which each constituent element takes charge of and some functions among primary functions which the respective constituent elements take charge of may be exclusively performed by other constituent elements.

The expression "a first," "a second," "the first," or "the second" used in various exemplary embodiments of the present specification may modify various constituent elements regardless of the order and/or the importance but does not limit the corresponding constituent elements For example, a first constituent element may be referred to as a second constituent element, and similarly, a second constituent element may be referred to as a first constituent element without departing from the scope of the technology disclosed in the present specification.

In the present specification, the expressions "selective" and "selectively" mean that a subsequently described event or circumstance may occur or may not occur, and that the description includes a case in which the event or circumstance occurs and a case in which the event or circumstance does not occur.

In the present specification, when a portion of a film, layer, region, constituent element, and the like is described to be "on" another portion, not only the case directly on the other part, the description includes a case in which the portion is directly on the other portion, and a case in which another film, layer, region, a constituent element or the like is interposed therebetween.

In the present specification, the term "nano" refers to an object with at least one dimension in the nm range. A nano-sized object may have any one of a wide variety of shapes, and may be formed of a wide variety of materials. For example, the nano-sized object includes nanowires, nanotubes, nanoplatelets, nanoparticles, and other nanostructures.

In the present specification, the term "micro" refers to an object having at least one dimension in the µm range. Typically, each dimension of a micron-sized object is in the µm range or beyond the µm range. The micron-sized object may have any one of a wide variety of shapes, and may be formed of a wide variety of materials. For example, the micron-sized object includes microwires, microtubes, microparticles, and other microstructures.

In the present specification, "transparent" refer to having a transmittance characteristic of about 80% or more in a visible ray region (400 to 700 nm).

Unless otherwise defined, all terms (including technical and scientific terms) used in the present specification may be used with the meaning commonly understood by a person of ordinary skill in the art to which the present invention belongs. In addition, terms defined in a generally-used dictionary are not to be interpreted ideally or excessively, unless otherwise defined herein.

Hereinafter, a transparent conductor and a manufacturing method thereof according to a preferred exemplary embodiment will be described in detail.

Transparent Conductor (First Exemplary Embodiment)

According to an exemplary embodiment of the present invention, as illustrated in FIG. 1, there may be provided a transparent conductor 100 including a substrate 110, a nanostructure 120 formed on an upper surface of the substrate, and a transparent conductive pattern 130 on the substrate on which the nanostructure is formed.

A transparent conductor according to an exemplary embodiment of the present invention has a merit such as an increase in adherence due to an increase in a contact area between a lower portion of the conductor and nanostructured protrusions and depressions on a substrate. In addition, a region where the transparent conductive pattern is not formed on the upper surface of the substrate may prevent total reflection of light due to the nanostructured protrusions and depressions on the substrate, increase an amount of incident light, and enable realization of higher light extraction efficiency.

According to an exemplary embodiment, the substrate may be made of a transparent material capable of transmitting light, that is, may be a transparent substrate made of a transparent material such as glass or a transparent plastic film or sheet, and in some cases, the substrate may be made of an opaque material suitable for application. For example, the transparent material include any material usable as the transparent substrate, such as quartz, sapphire, lithium aluminum oxide, magnesium oxide, urethane resin, polyimide resin, polyester resin, (meth)acrylate-based polymer resin, polyolefin-based resin such as polyethylene or polypropylene, and the like. In addition, the transparent material may be, for example, a film with a visible light transmittance of 80% or more, such as polyethylene terephthalate (PET), cyclic olefin polymer (COP), polyethylene naphthalate (PEN), polyethersulfone (PES), polycarbonate (PC), and acetyl celluloid.

According to an exemplary embodiment, a thickness of the substrate may be 10 to 200 µm, preferably 20 to 150 µm, and more preferably 30 to 100 µm.

According to an exemplary embodiment, a nanostructure is formed on the upper surface of the substrate. The nanostructure is mainly at a nanometer level. However, in the present specification, the nanostructure is used with a concept that includes several micrometers. In the present specification, the nanostructure may have a protrusion-depression shape, but is not limited thereto, and may have any shape and include at least one pattern. For example, a pattern of the nanostructure may have a stripe shape or a circular shape. A length of the pattern of the nanostructure may be about 1 µm or less, and specifically, a width of the pattern may be about 1 µm or less in the stripe shape, and a diameter of the pattern may be about 1 µm or less in the circular shape.

In addition, at least one pattern provided in the nanostructure may be disposed in a regular or irregular structure on the substrate.

In addition, the nanostructure may include the same material as that of the substrate or a different material from that of the substrate.

According to an exemplary embodiment, the nanostructure may be manufactured through a process apparent to a person of ordinary skill in the art, and the process may include, for example, photolithography, electron beam lithography, nano-imprint lithography, UV, EUV or soft X-ray lithography, 2D or 3D lithography, stereolithography, soft lithography, focused electron or ion beam, scanning tunneling microscopy, scanning probe lithography, atomic force microscopy, sol-gel nanofabrication, two or more photon lithography, dip pen lithography, near field lithography, laser-assisted imprinting, temperature substrate patterning, laser-based patterning, laser direct writing processes, but is not limited thereto.

According to an exemplary embodiment, a transparent conductive pattern is formed on the substrate on which the nanostructure is formed. The transparent conductive pattern may be formed by coating a transparent conductive layer on the substrate on which the nanostructure is formed, and then selectively patterning the transparent conductive layer.

According to an exemplary embodiment, the transparent conductive layer is made of a transparent conductive material with conductivity and photosensitivity, and has a concept that includes all conductive materials such as a transparent conducting oxide (TCO), a transparent conductive polymer, a carbon conductive material, a metal, a metal oxide, a metal nitride, a metal oxynitride, and the like. The transparent conductive pattern may include, for example, at least one selected from CNT, graphene, poly(3,4-ethylene di oxy thiophene) (PEDOT), poly(styrene-sulfonate) (PSS), silver nanowire (AGNW), Cu nanowire, hybrid AGNW (CNT+AGNW), hybrid graphene (AGNW+graphene), Cu, Cu alloy, Ag, Ag alloy, Au, Al, pt, pd, Ti, Sn, Ni+Cr, Ni+Ni alloy, Mo/Ag, Mo/Al/Mo, Ni+Cr/Cu/Ni+Cr, Ni alloy/Cu, Ni alloy/Cu/Ni alloy, Mo/APC, Cu/Ni+Cu+Ti, Ni+Cu+Ti/Cu/Ni+Cu+Ti, carbon, ITO, fluorine doped tin oxide (FTO), indium zinc oxide (IZO), antimony tin oxide (ATO), and aluminum doped zinc oxide (AZO).

According to an exemplary embodiment, the transparent conductive layer is formed by coating the transparent conductive material on the substrate on which the nanostructure is formed. A method of forming the transparent conductive layer is not limited, and publicly known methods such as spin coating, roll coating, spray coating, dip coating, ink coating and the like may be used.

According to an exemplary embodiment, the transparent conductive pattern is formed by selectively patterning the transparent conductive layer. A method of forming the transparent conductive pattern is not limited, and methods such as printings such as photolithography, inkjet, gravure, imprinting, offset, and the like, electroplating, vacuum deposition, thermal deposition, sputtering, electron beam deposition, and the like maybe used, and preferably, a sintering process such as selective laser sintering (SLS) or selective mask sintering (SMS) may be used.

According to an exemplary embodiment, a line width of the transparent conductive pattern is not particularly limited, but may be 50 nm to 100 μm. In addition, a thickness (height) of the transparent conductive pattern is not particularly limited, but may be 5 nm to 50 μm. The thickness (height) of the transparent conductive pattern may vary depending on the line width of the pattern and a requirement for electrical characteristics (conductivity and resistivity) of an application device.

According to an exemplary embodiment, unit patterns included in the transparent conductive pattern may have any shape, and, may have, for example, a stripe shape or circular shape, or may be a polygon pattern. The unit patterns are connected to each other.

In addition, the transparent conductive pattern may include a regular pattern. The regular pattern means that a pattern shape has regularity. For example, the unit patterns may include, independently of each other, a mesh shape such as a rectangle or square, or a pattern with a shape such as a hexagon.

In addition, the transparent conductive pattern may include an irregular pattern. The irregular pattern means that a pattern shape does not have regularity.

In addition, when the transparent conductive pattern is formed of a material such as a metal nanowire, a carbon-based material, a polymer material, or the like, the transparent conductive pattern may have a network structure. When the transparent conductive pattern has the network structure, a signal may be sequentially transmitted to adjacent patterns that are in contact with each other, thereby realizing a pattern with high sensitivity.

Figure 2:
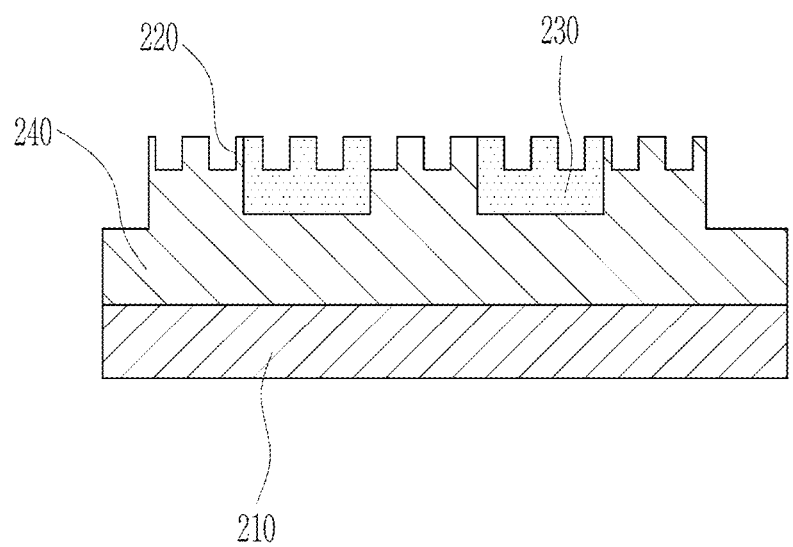

According to an exemplary embodiment, as illustrated in FIG. 2, there may be provided a transparent conductor 220 including a transparent substrate 210, a transparent transfer layer 240 formed on the transparent substrate, and a transparent conductive pattern 230 embedded in an upper portion of the transparent transfer layer, wherein the transparent transfer layer and the transparent conductive pattern include a nanostructure 220 on an upper surface thereof.

Figure 3:
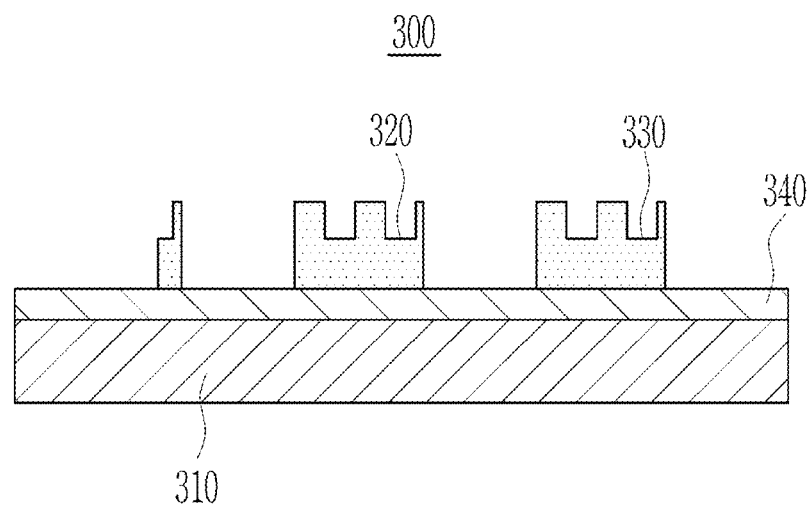

In addition, as illustrated in FIG. 3, there may be provided a transparent conductor 300 including a transparent substrate 310, a transparent transfer layer 340 formed on the transparent substrate, and a transparent conductive pattern 330 formed on the transparent transfer layer, wherein the transparent conductive pattern including a nanostructure 320 on an upper surface thereof.

In a transparent conductor according to an exemplary embodiment of the present invention, a contact area of the conductor itself may be increased due to a nanostructure on a transparent conductive pattern, and thus the transparent conductor with the increased contact area and a transparent electrode may be manufactured. In this case, a reaction area between a semiconductor of an upper portion of the conductor and an active layer may be increased, and thus an increase in efficiency may be expected when a device is manufactured. In addition, a region where the transparent conductive pattern is not formed in the transparent transfer layer may prevent total reflection of light, increase an amount of incident light, and enable realization of higher light extraction efficiency, due to nanostructured protrusions and depressions on the transparent transfer layer.

According to an exemplary embodiment, the transparent transfer layer may be formed by allowing a transparent transfer material to be coated on or attached to a surface of a substrate to be transferred (a transfer target substrate), and transferring the transparent transfer material onto a substrate on which a nanostructure and a transparent conductive pattern are formed. The transfer target substrate may be a transparent substrate. There is no limitation as a transfer method, and a publicly known transfer method and laminating method may be used. For example, the transfer method may be performed by pressurizing by a roll and the like, or by pressurizing and heating, or a publicly known laminator such as a laminator, a vacuum laminator, and an auto-cut laminator capable of further increasing productivity may be used.

The transparent transfer layer formed on the transfer target substrate may be transferred onto an upper surface of the substrate on which the nanostructure and the transparent conductive pattern are formed, or the transparent conductive pattern. When the transparent transfer layer is transferred onto the surface of the substrate on which the nanostructure and the transparent conductive pattern are formed, the nanostructure may be transferred to the transfer target substrate together. In addition, when the transparent transfer layer is transferred onto the transparent conductive pattern of the substrate on which the nanostructure and the transparent conductive pattern are formed, only the transparent conductive pattern may be selectively transferred to the transfer target substrate.

According to an exemplary embodiment, the transparent transfer material may be selected from a transparent polymer, a transparent inorganic material, a metal oxide, and a fiber. For example, the polymer may be polydimethylsiloxane (PDMS), PET, polyacrylonitrile (PAN), or a mixture of two or more thereof. For example, the transparent inorganic material may be various types of glass windows such as quartz glass, alkali-free glass, alkali glass, sapphire glass, and the like, or a transparent inorganic mineral such as mica or the like. For example, the metal oxide may be ITO, FTO, or a mixture thereof.

Figure 4:
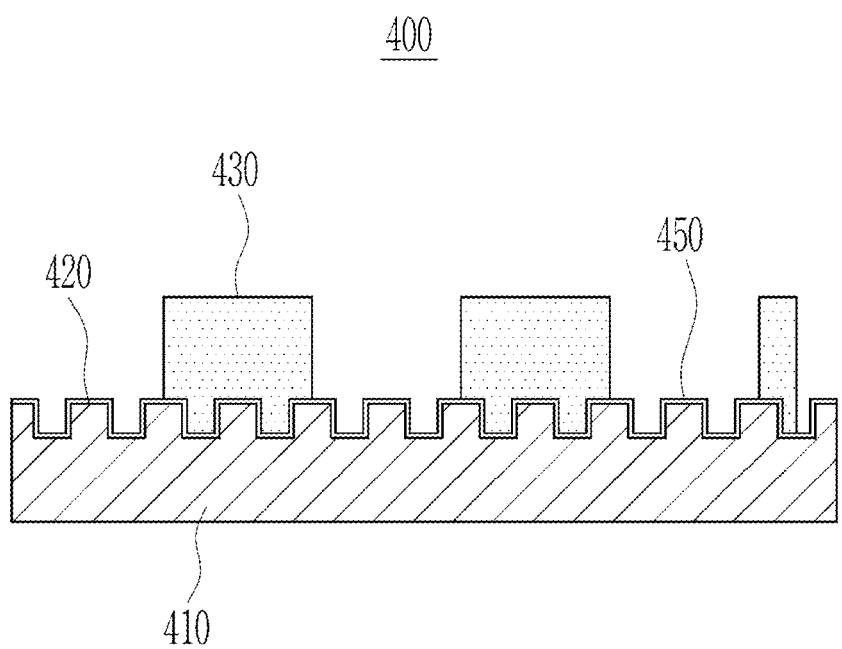

According to an exemplary embodiment, as illustrated in FIG. 4, there may be provided a transparent conductor 400 including a transparent substrate 410 and a transparent conductive pattern 430 formed on the transparent substrate, wherein the transparent substrate includes a nanostructure 420 formed on an upper surface of the transparent substrate and a conductive layer 450 coated on the transparent substrate on which the nanostructure is formed.

Figure 5:
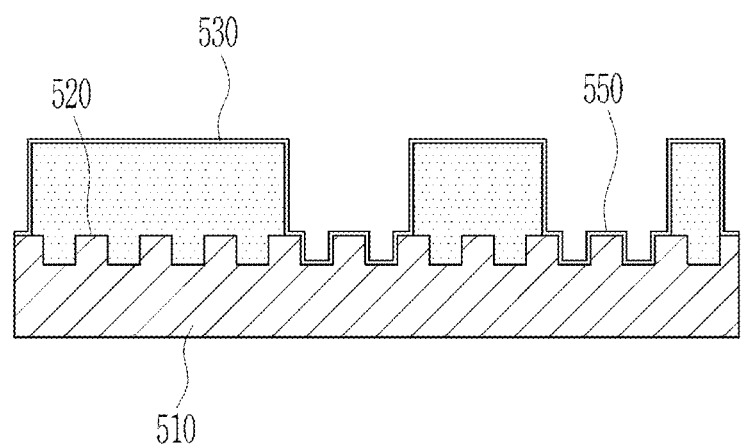

In addition, as illustrated in FIG. 5, there may be provided a transparent conductor 500 including a transparent substrate 510 and a transparent conductive pattern 530 formed on the transparent substrate, wherein the transparent substrate includes a nanostructure 520 formed on an upper surface of the transparent substrate and a conductive layer 550 coated on the transparent substrate on which the nanostructure is formed.

A transparent conductor according to an exemplary embodiment of the present invention may further include a conductive layer, thereby increasing an area of a photoactive layer to prevent quenching of an exciton, and facilitating a movement of a charge and/or exciton and a flow of energy to implement a device having high efficiency and a long lifespan.

According to an exemplary embodiment, the conductive layer may include a material having conductivity, and as the material having conductivity, any material capable of selectively transmitting light with a specific wavelength as well as a visible ray region may be used without limitation, and the material having conductivity may include at least one of a metallic material, a carbon material, or a polymer material, but is not limited thereto. For example, the material having conductivity may include PEDOT, PSS, polyaniline, CNT, graphene, AGNW, Cu nanowire, hybrid AGNW (CNT+AGNW), hybrid graphene (AGNW+graphene), Ag mesh, Cu mesh, ITO, FTO, IZO, ATO, tungsten oxide ($WO_3$), bismuth vanadium oxide ($BiVO_4$), silicon oxide (SiOx), zirconium oxide ($ZrO_2$), zinc oxide (ZnO), tin oxide ($SnO_2$), quantum dots, borophene, 2D boron nitride (BN), boron carbonitride (BCN), molybdenum disulfide ($MoS_2$), hafnium disulfide ($HfS_2$), and the like. The quantum dots may include at least one selected from compounds indicated by CdS, MgSe, MgO, CdO, CdSe, CdTe, InP, InAs, ZnS, ZnSe, ZnTe, HgTe, GaN, GaP, GaAs, GaSb, InSb, AlAs, AlSb, PbSe, PbS, PbTe, Cu(InIn, Ga)S, Cu(In,Ga)Se, Cu(Zn, Sn)(S,Se), Pb(S,Se), and Cd(S,Se).

The material having conductivity may have a light transmittance of 80% or more, and a sheet resistance of 1000Ω or less, preferably 0.1Ω or more and 1000Ω or less.

According to an exemplary embodiment, a thickness of the conductive layer may be 10 to 200 nm, but is not limited thereto.

According to an exemplary embodiment, the conductive layer may be formed by coating a transparent conductive material on a substrate, and a formation method is not limited, and a method suitable for application such as chemical vapor deposition (CVD), physical vapor deposition, a solution process, or the like may be used. For example, vapor deposition may be used for materials such as ITO, FTO, IZO, and the like, and these materials are also available in liquid form. As the CVD, a thermal CVD, a rapid thermal CVD, an inductively coupled plasma CVD, a surface wave plasma CVD, or the like may be used. As the physical vapor deposition, sputtering, e-beam evaporation, thermal evaporation, laser molecular beam epiraxy, pulsed laser deposition, and the like may be used. In addition, the solution process is mainly used for materials such as an AGNW, Cu nanowire, CNT, graphene, transparent conductive polymers (PEDOT, PSS, and the like), and the like. For example, spin coating, dip coating, bar coating, screen printing, slide coating, roll coating, slit coating, spray coating, dipping, ink-jet printing, and the like may be used.

Figure 6:
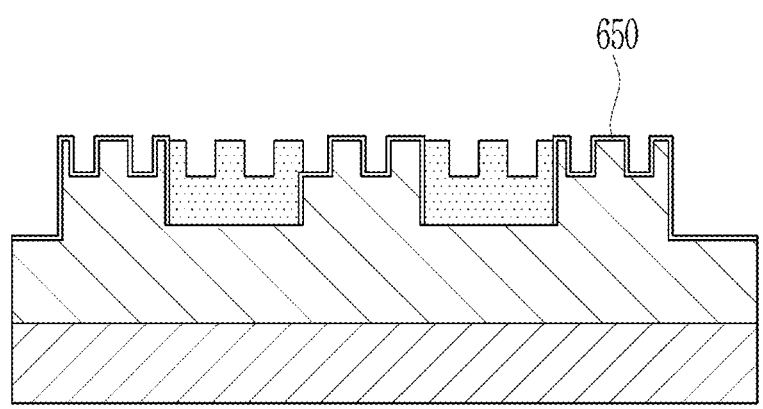

According to an exemplary embodiment, as illustrated in FIG. 6, in the transparent conductor 200, there may be provided a transparent conductor 600 further including a conductive layer 650 coated on a nanostructure formed on an upper surface of the transparent transfer layer.

Figure 8:
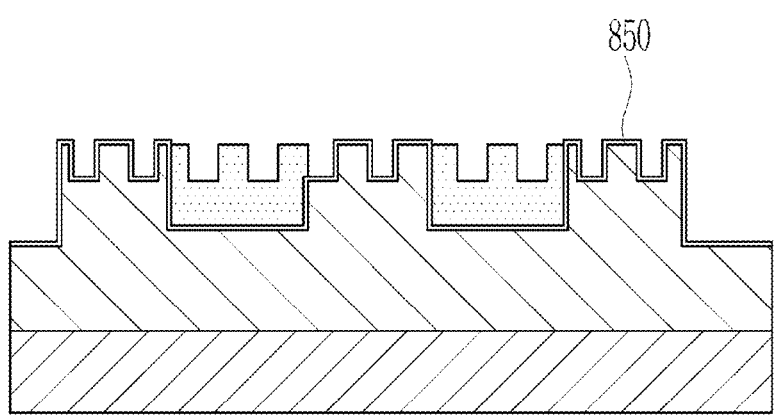

In addition, as illustrated in FIG. 8, in the transparent conductor 600, there may be provided a transparent conductor 800 further including a conductive layer 850 coated between the transparent transfer layer and the transparent conductive pattern.

Figure 7:
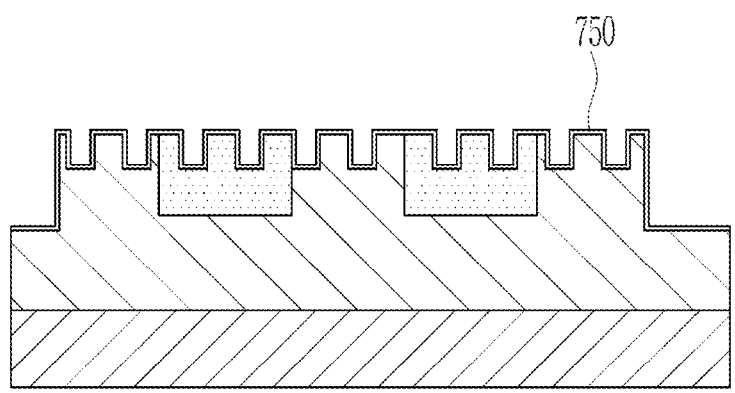

According to an exemplary embodiment, as illustrated in FIG. 7, in the transparent conductor 200, there may be provided a transparent conductor 700 further including a conductive layer 750 coated on a nanostructure formed on upper surfaces of the transparent transfer layer and the transparent conductive pattern.

Figure 9:
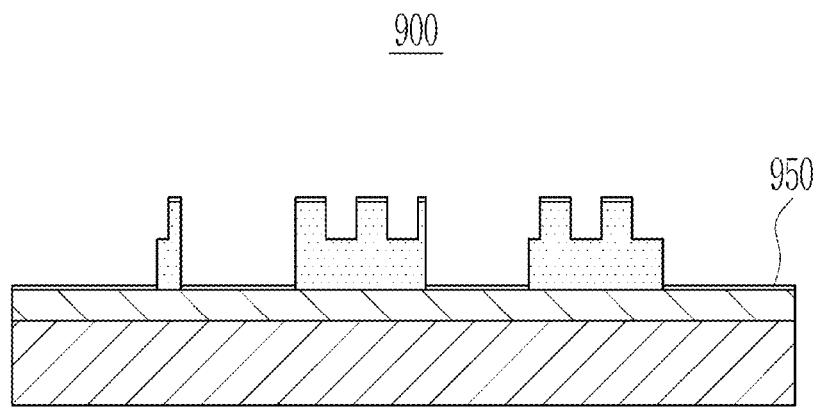

According to an exemplary embodiment, as illustrated in FIG. 9, in the transparent conductor 300, there may be provided a transparent conductor 900 further including a conductive layer 950 coated on the transparent conductor.

According to an exemplary embodiment, there may be provided various devices including a transparent conductor according to an exemplary embodiment of the present invention. The transparent conductor according to an exemplary embodiment of the present invention may be employed as transparent electrodes of various electronic devices. For example, the transparent conductor may be used as a circuit and transparent electrode for EMI shielding, an electroluminescent lamp, a touch screen, a photovoltaic device, and a flat panel display.

Manufacturing Method of Transparent Conductor
(First Exemplary Embodiment)

Figure 10:
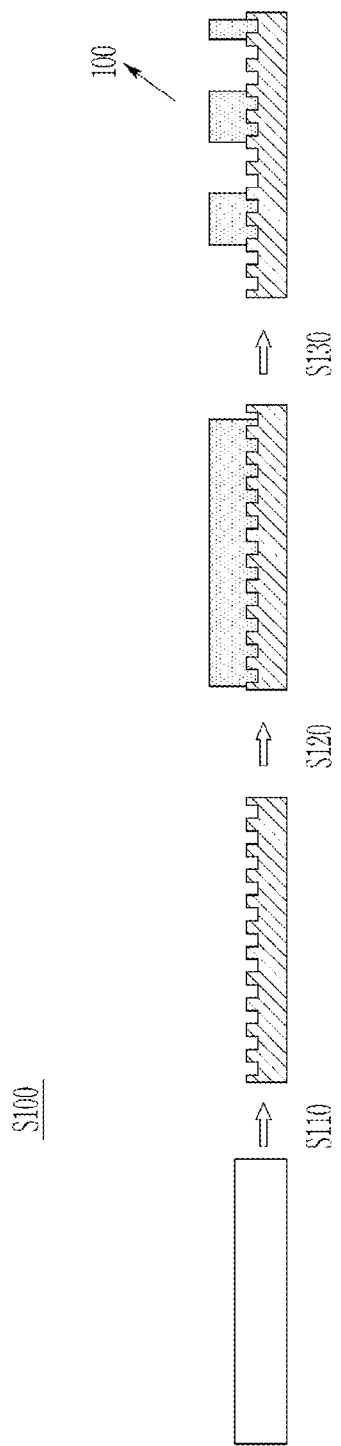
FIGS. 10 to 17 are diagrams schematically illustrating a manufacturing method of a transparent conductor according to an exemplary embodiment of the present invention.

Referring to FIG. 10, a manufacturing method of a transparent conductor (S100) according to an exemplary embodiment of the present invention may include forming a nanostructure on an upper surface of a first substrate (operation S110), coating a transparent conductive layer on the first substrate on which the nanostructure is formed (operation S120), and forming a transparent conductive pattern by selectively patterning the transparent conductive layer (operation S130). According to an exemplary embodiment, the transparent conductor 100 according to an exemplary embodiment of the present invention may be manufactured through the manufacturing method (S100).

Figure 11:
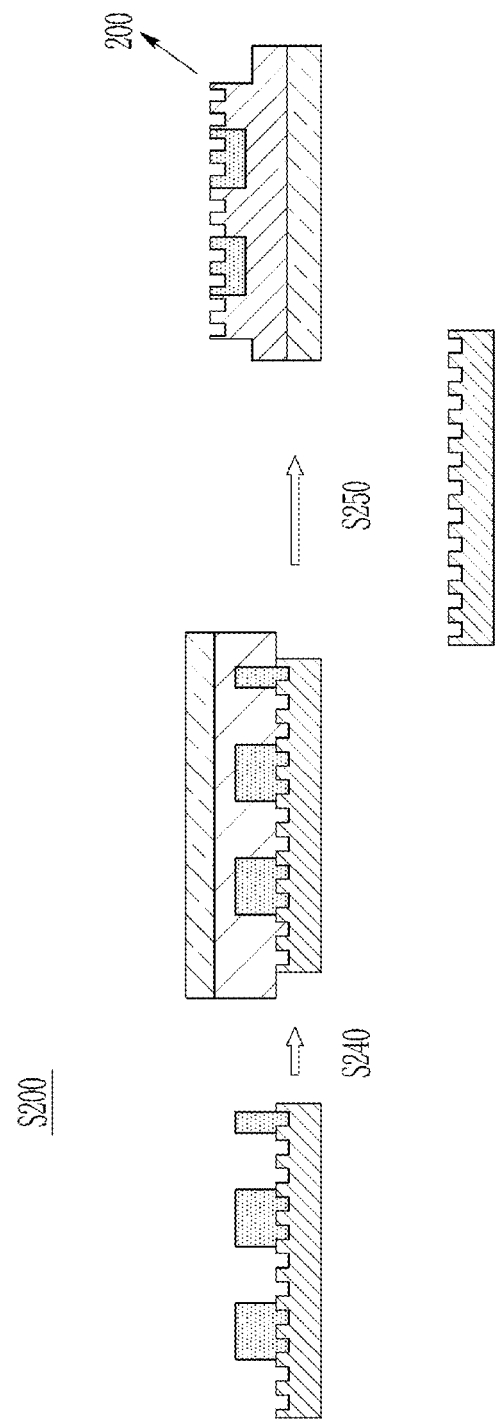

According to an exemplary embodiment, referring to FIG. 11, a manufacturing method of a transparent conductor (S200) may include, after operation S130, placing a second substrate including a transparent transfer layer on the first substrate, and then transferring the transparent transfer layer onto the first substrate on which the transparent conductive pattern is formed (operation S240), and separating the first substrate (operation S250). According to an exemplary embodiment, the transparent conductor 200 according to an exemplary embodiment of the present invention may be manufactured through the manufacturing method (S200).

A material of the first substrate is not limited, but the second substrate is preferably made of a transparent material. The second substrate may be a transfer target substrate, and the transparent transfer layer formed on the transfer target substrate may be transferred onto a surface of a substrate on which the nanostructure and the transparent conductive pattern are formed to duplicate a nanostructure of a lower portion of the first substrate, and resultantly, an embedded transparent conductor may be formed.

According to an exemplary embodiment, a method manufacturing of a transparent conductor (S601) may further include, after operation S250, selectively coating a conductive layer only on a transparent transfer layer on which the nanostructure is formed in a region where there is no transparent conductive pattern by using a process such as a mask or the like on the conductor (operation S606). According to an exemplary embodiment, the transparent conductor 600 according to an exemplary embodiment of the present invention may be manufactured through the manufacturing method (S601).

According to an exemplary embodiment, a manufacturing method of a transparent conductor (S701) may further include, after operation S250, coating a conductive layer on the conductor (operation S706). According to an exemplary embodiment, the transparent conductor 700 according to an exemplary embodiment of the present invention may be manufactured through the manufacturing method (S701).

Figure 12:
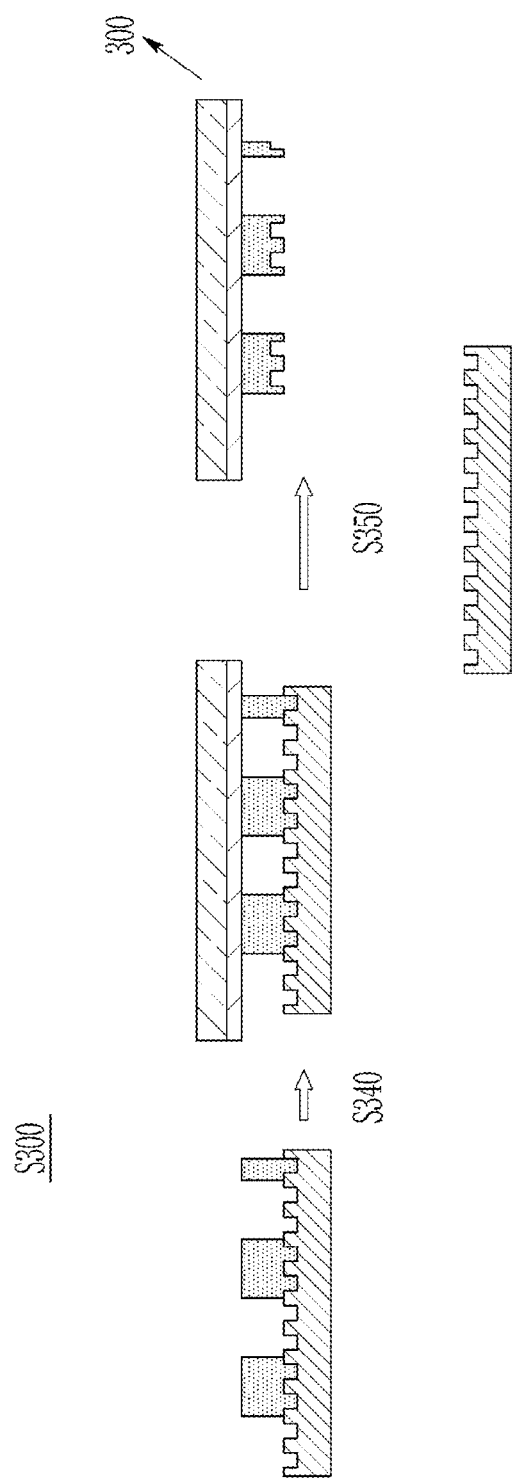

According to an exemplary embodiment, referring to FIG. 12, a manufacturing method of a transparent conductor (S300) may further include, after operation S130, placing a second substrate including a transparent transfer layer on the transparent conductive pattern, and then transferring the transparent transfer layer onto the transparent conductive pattern (operation S340); and separating the first substrate (operation S350). According to an exemplary embodiment, the transparent conductor 300 according to an exemplary embodiment of the present invention may be manufactured through the manufacturing method (S300).

A material of the first substrate is not limited, but the second substrate is preferably made of a transparent material. The second substrate may be a transfer target substrate, and the transparent transfer layer formed on the transfer target substrate may be transferred onto a transparent conductive pattern of a substrate on which the nanostructure and the transparent conductive pattern may be formed to selectively transfer only the transparent conductive pattern, and resultantly a protruding transparent conductor may be formed.

Figure 17:
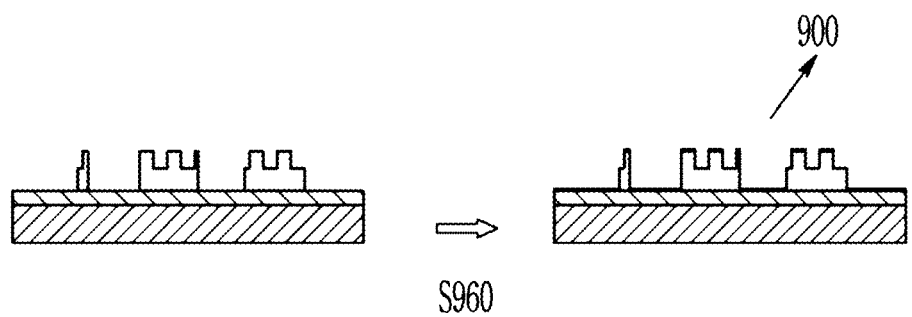

According to an exemplary embodiment, referring to FIG. 17, a manufacturing method of a transparent conductor (S900) may further include, after operation S350, coating a conductive layer on the conductor (operation S960). According to an exemplary embodiment, the transparent conductor 900 according to an exemplary embodiment of the present invention may be manufactured through the manufacturing method (S900).

Figure 13:
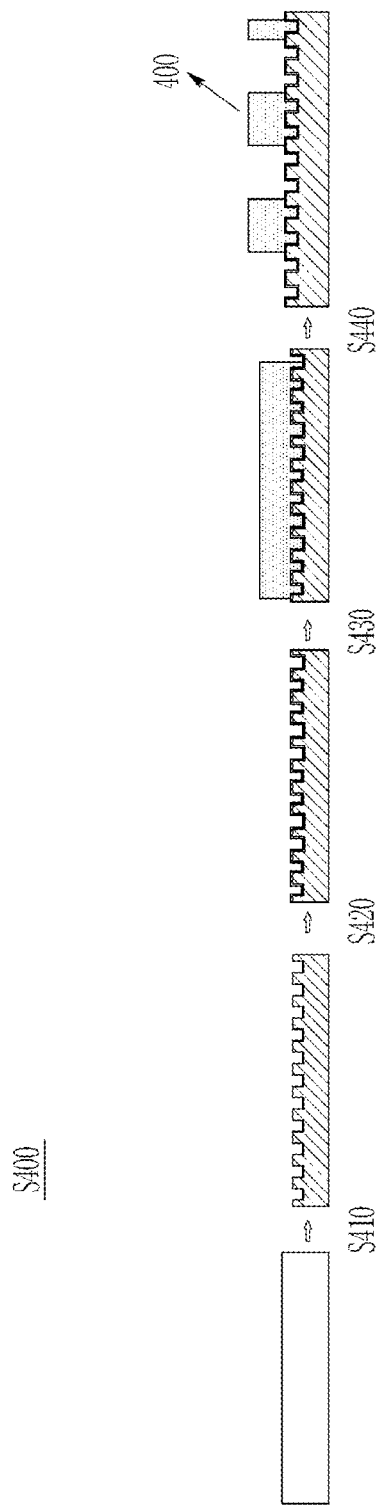

According to an exemplary embodiment, referring to FIG. 13, a manufacturing method of a transparent conductor (S400) may include forming a nanostructure on an upper surface of a first substrate (operation S410), coating a conductive layer on the first substrate on which the nanostructure is formed (operation S420), coating a transparent conductive layer on the first substrate coated with the conductive layer (operation S430), and forming a transparent conductive pattern by selectively patterning the transparent conductive layer (S440). According to an exemplary embodiment, the first substrate may be a transparent substrate. According to an exemplary embodiment, the transparent conductor 400 according to an exemplary embodiment of the present invention may be manufactured through the manufacturing method (S400).

Figure 14:
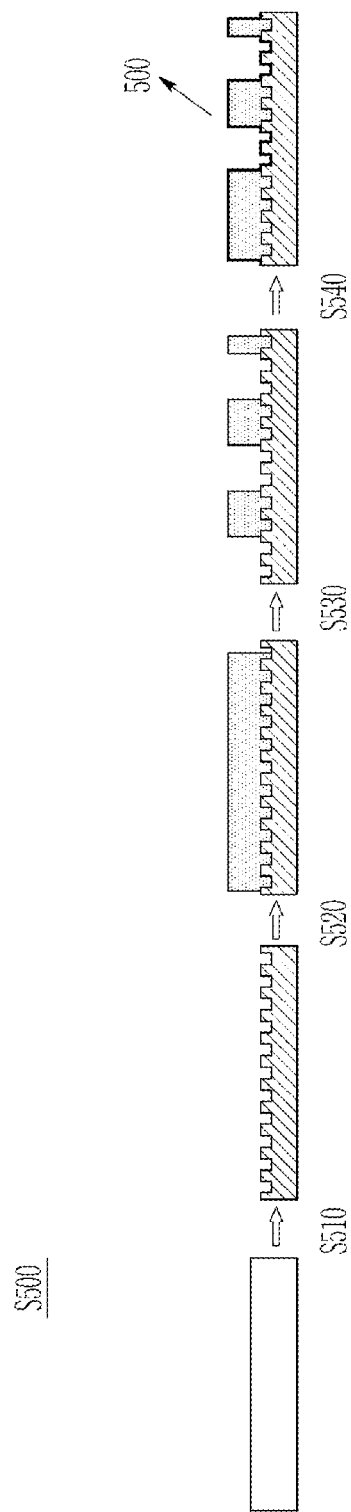

According to an exemplary embodiment, referring to FIG. 14, a manufacturing method of a transparent conductor (operation S500) may include forming a nanostructure on an upper surface of a first substrate (operation S510), coating a transparent conductive layer on the first substrate on which the nanostructure is formed (operation S520), forming a transparent conductive pattern by selectively patterning the transparent conductive layer (operation S530), and coating a conductive layer on the first substrate on which the transparent conductive pattern is formed (operation S540). According to an exemplary embodiment, the first substrate may be a transparent substrate. According to an exemplary embodiment, the transparent conductor 500 according to an exemplary embodiment of the present invention may be manufactured through the manufacturing method (S500).

The conductive layer may function as a photoactive layer, and thus photocharged particles generated by light may be efficiently converted into electrical energy, and resultantly a high-efficiency conductor may be formed.

Figure 15:
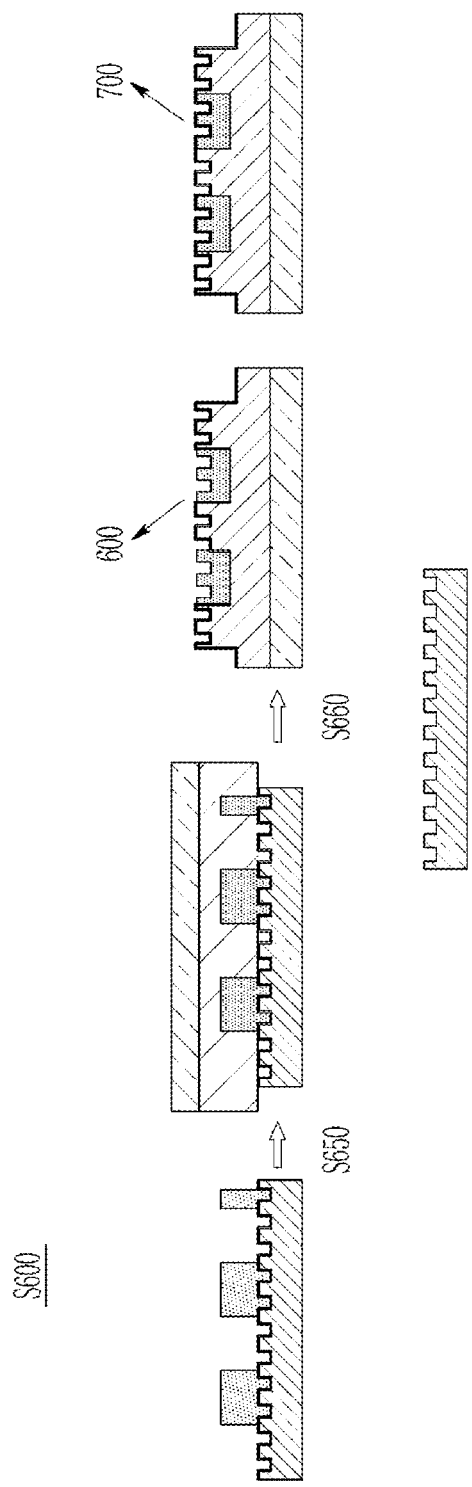

According to an exemplary embodiment, referring to FIG. 15, a manufacturing method of a transparent conductor (S600) may further include, after operation S440, placing a second substrate including a transparent transfer layer on the first substrate, and then transferring the transparent transfer layer onto the first substrate on which the transparent conductive pattern is formed (operation S650), and separating the first substrate (operation S660).

Adherence between the transparent conductive pattern and the conductive layer may be weaker than adherence between the first substrate and the conductive layer. In this case, in the separating of the first substrate, the transparent conductive pattern and the conductive layer may be separated, the conductive layer may remain on the first substrate, and the transparent conductor 600 according to an exemplary embodiment of the present invention may be manufactured.

In addition, the adherence between the transparent conductive pattern and the conductive layer may be stronger than the adherence between the first substrate and the conductive layer. In this case, in the separating of the first substrate, the first substrate and the conductive layer may be separated, the conductive layer may be formed on the transparent conductive pattern, and the transparent conductor 700 according to an exemplary embodiment of the present invention may be manufactured.

Figure 16:
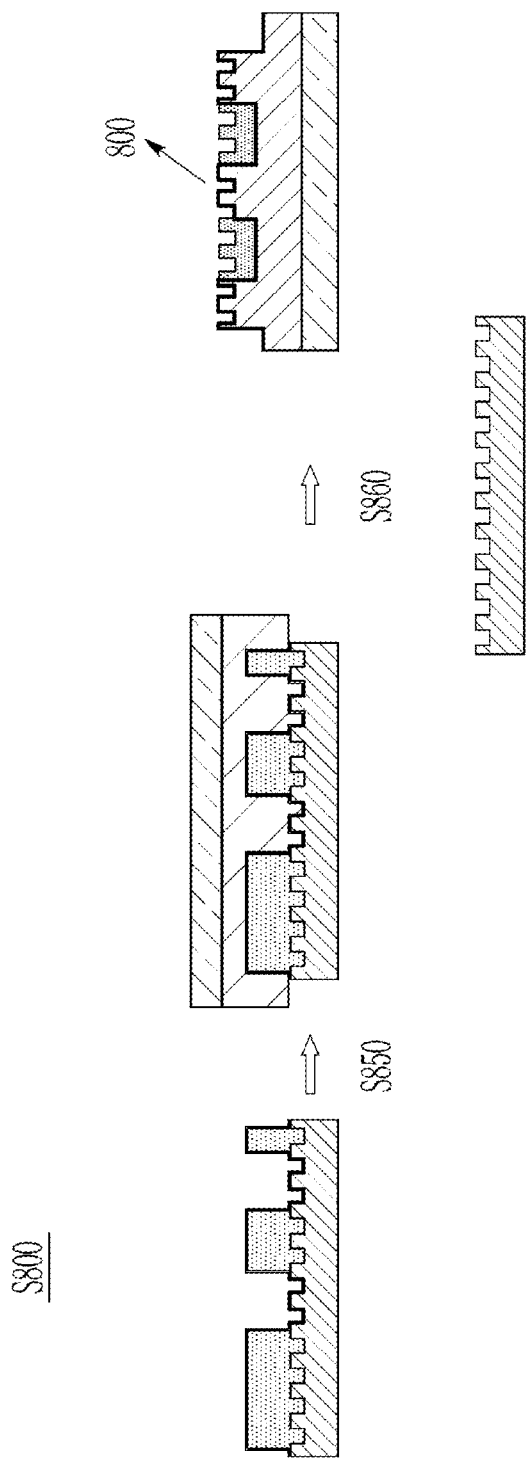

According to an exemplary embodiment, referring to FIG. 16, a manufacturing method of a transparent conductor (S800) may further include, after operation S540, placing a second substrate including a transparent transfer layer on the first substrate, and then transferring the transparent transfer layer onto the first substrate on which the transparent conductive pattern is formed (operation S850), and separating the first substrate (operation S860).

Adherence between the first substrate and the conductive layer may be weak. In this case, in the separating of the first substrate, the first substrate and the conductive layer may be separated, the conductive layer may be also formed on a lower portion of the transparent conductive pattern embedded in an upper portion of the transparent transfer layer, and the transparent conductor 800 according to an exemplary embodiment of the present invention may be manufactured.

Hereinafter, a transparent conductor and a manufacturing method thereof according to another exemplary embodiment of the present invention will be described in detail. In the following description of a second exemplary embodiment, contents that overlap with those of the above-described first exemplary embodiment will be omitted.

Transparent Conductor (Second Exemplary Embodiment)

Figure 18:
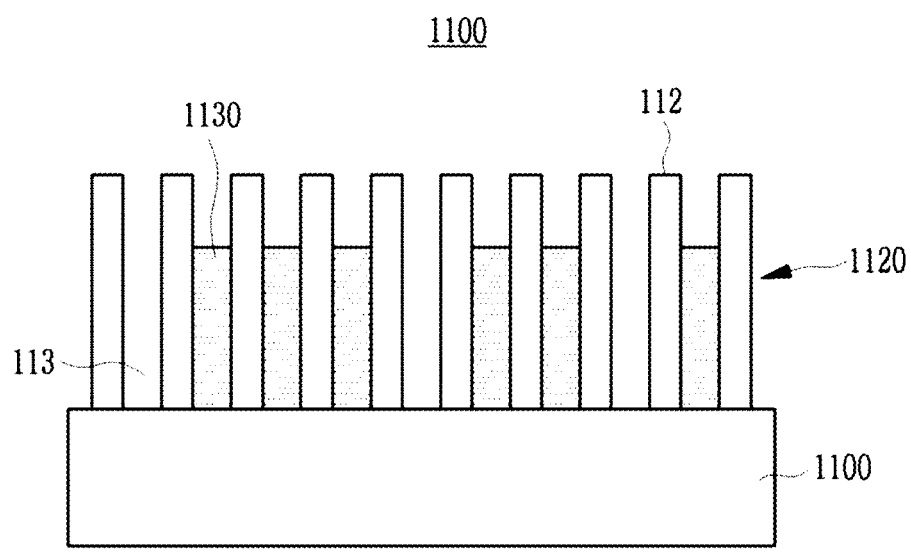
FIGS. 18 to 30 are diagrams illustrating cross-sections of a transparent conductor according to another exemplary embodiment of the present invention.

According to an exemplary embodiment of the present invention, as illustrated in FIG. 18, there may be provided a transparent conductor 1100 including a transparent substrate 1110, a nanostructure portion 1120 formed on the transparent substrate, the nanostructure portion 1120 including a plurality of nanopillars 1120, and a transparent conductive pattern portion 1130 formed on the transparent substrate on which the nanostructure portion is formed. In the transparent conductor 1100, a height of the nanostructure portion 1120 may be relatively greater than a height of the transparent conductive pattern portion 1130.

Figure 19:
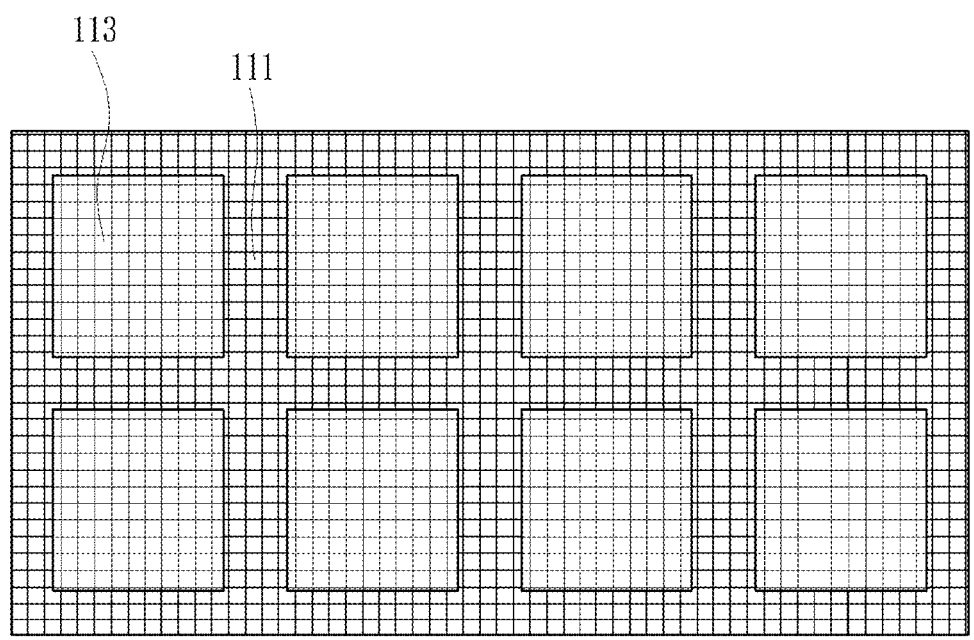

In a transparent conductor according to an exemplary embodiment of the present invention, referring to FIG. 19 which is a plan view from above, a transparent window 111 may be formed inside a transparent conductive pattern portion due to a nanostructure portion passing through the inside of the transparent conductive pattern portion, thereby improving light transmittance of the conductor. Furthermore, a transparent region caused by a plurality of nanopillars may be formed not only in the inside of the transparent conductive pattern portion but also in a region 113 where the transparent conductive pattern portion is not formed on a substrate, thereby greatly improving the light transmittance of the entire conductor.

A transparent conductor according to an exemplary embodiment of the present invention may prevent total reflection of light due to nanostructured protrusions and depressions on the substrate, increase an amount of incident light, and enable realization of higher light extraction efficiency. In addition, the nanostructure portion including the plurality of nanopillars formed on the substrate may also serve to support a transparent conductive layer on the substrate, thereby improving adherence between the conductive layer and the substrate, and enabling implementation of a more stable conductor.

According to an exemplary embodiment, a nanostructure portion is formed on a substrate. The nanostructure portion may include a plurality of nanopillars having a circular shape or a polygonal columnar shape or polygonal pyramidal shape having an arbitrary polygonal cross-section such as a triangle, a quadrangle, a pentagon, a hexagon, or the like. The plurality of nanopillars may be uniformly formed over an exposed entire surface of the substrate, and may be disposed in a plurality of rows and a plurality of columns.

According to an exemplary embodiment, each nanopillar may have a nano size. For example, each nanopillar may have a diameter (D) of about 10 nm to about 100 nm, and a center-to-center distance (L) between two adjacent nanopillars may be about 30 nm to about 300 nm. In addition, each nanopillar may have a height (H) of about 100 nm to about 1000 nm, but it is possible to adjust the height of each nanopillar by etching according to an electrical characteristic requirement of an application device.

According to an exemplary embodiment, a height of a nanostructure portion may be formed to be greater than a height of a transparent conductive pattern portion. In this case, a plurality of nanopillars included in the nanostructure portion may pass through the inside of a transparent conductive pattern portion to form a transparent window caused by the nanopillars inside a conductive layer.

According to an exemplary embodiment, a nanopillar may be formed by etching a portion of an upper surface of a substrate, but is not limited thereto, and may be implemented by selectively growing the nanopillar on the upper surface of the substrate. For example, after forming a catalyst including at least one element of a group consisting of ferrum (Fe), nickel (Ni), cobalt (Co), and palladium (Pd) on the upper surface of the substrate, a reaction gas may be supplied to cause glow discharge, and the reaction gas ionized by glow discharge may be provided onto the catalyst to grow a nanotube or nanowire, thereby implementing the nanopillar.

According to an exemplary embodiment, a nanopillar may include the same material as that of a substrate or a different material from that of the substrate, and may be formed of, for example, one material of a transparent material such as glass, acryl, PET, PEN, polymethylmethacrylate (PMMA) and colorless polyimide (CPI), polyethylene, polypropylene, polysulfone, polyurethane, polyether ether ketone, polythermide, polycarbonate, polyaniline, cyclic olefin copolymer, silk, or the like, or a polymer-based material capable of allowing light to pass therethrough. A plurality of nanopillars according to an exemplary embodiment of the present invention may be preferably formed of a transparent nanopillar.

According to an exemplary embodiment, a transparent conductive pattern portion is formed on a transparent substrate on which the nanostructure portion is formed. The transparent conductive pattern portion may be formed by selectively patterning a transparent conductive layer.

According to an exemplary embodiment, a transparent conductive layer is formed by coating a transparent conductive material on a substrate on which the nanostructure is formed. A method of forming a transparent conductive layer is not limited, and publicly known methods such as spin coating, roll coating, spray coating, dip coating, inkjet coating, a coating method using a capillary force, an imprinting coating method, or the like may be used.

According to an exemplary embodiment, a height (thickness) of a transparent conductive layer may be about 10 nm to about 1000 nm, but is preferably formed to be relatively less than heights of upper surfaces of a plurality of nanopillars formed on a substrate.

According to an exemplary embodiment, a transparent conductive pattern portion may be formed by selectively patterning the transparent conductive layer. Accordingly, a transparent region caused by a plurality of nanopillars may be formed even in a region where a transparent conductive pattern portion is not formed on a substrate, thereby improving light transmittance of a conductor.

According to an exemplary embodiment, referring to FIG. 18, a height of a nanostructure portion may be formed to be greater than a height of a transparent conductive layer. In this case, a nanopillar included in the nanostructure portion may pass through the inside of the transparent conductive layer to form a transparent window caused by the nanopillar inside a conductive pattern layer.

Figure 22:
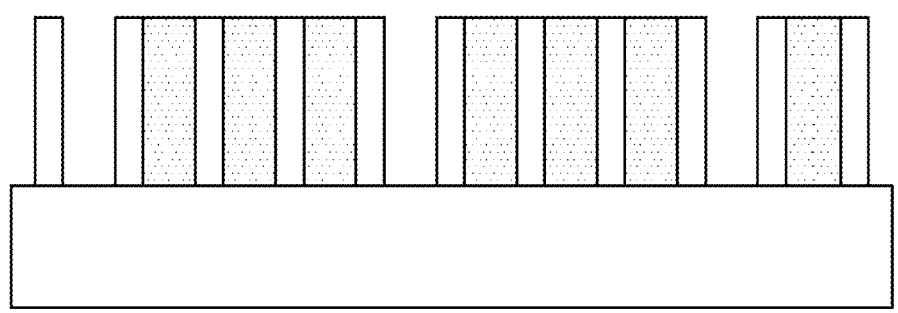

According to an exemplary embodiment, referring to FIG. 22, a height of a nanostructure portion may be equal to a height of a transparent conductive pattern portion. In this case, a plurality of nanopillars included in the nanostructure portion may be selectively etched to have a height equal to a height of an upper surface of the transparent conductive pattern portion through a predetermined etching process.

According to an exemplary embodiment, as an etching method, dry etching such as chemical mechanical planarization (CMP), ion-milling, reactive ion etching (RIE), atomic layer etching (ALE), or plasma etching, or wet etching may be used, or a mixture of two or more different methods may be used.

Figure 23:
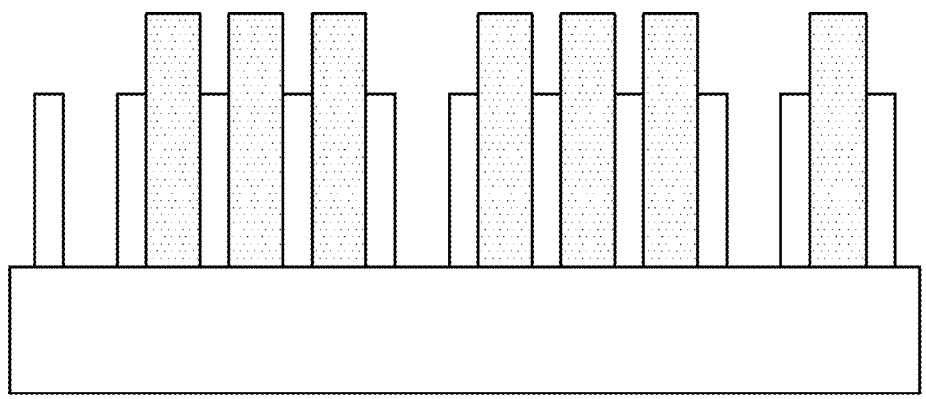

According to an exemplary embodiment, referring to FIG. 23, a height of a nanostructure portion may be less than a height of a transparent conductive pattern portion. In this case, a plurality of nanopillars included in the nanostructure portion may be selectively etched to have a lower height than a height of an upper surface of the transparent conductive pattern portion through the above-described predetermined etching process.

Figure 30:
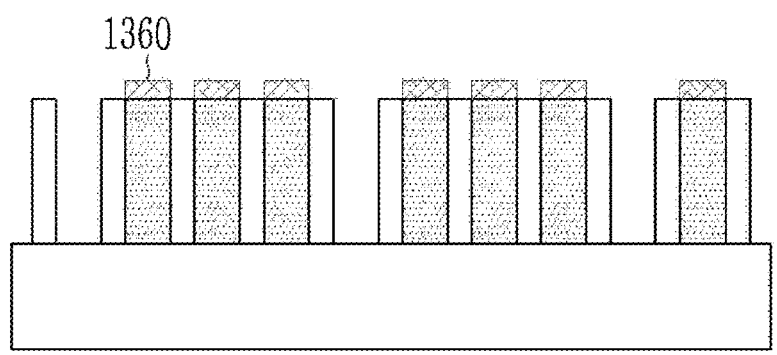

According to an exemplary embodiment, a conductive layer 1360 coated on a transparent conductive pattern portion may be further included (see FIG. 30). In a transparent conductor according to the present invention, a conductive layer may not be properly coated on a nanostructure portion including a plurality of nanopillars due to a poor superhydrophobic or wettability of the plurality of nanopillars. Accordingly, it is possible to selectively coat the conductive layer only on the transparent conductive pattern portion, thereby improving light transmittance of the conductor, and more practically and efficiently manufacturing the conductor.

Figure 20:
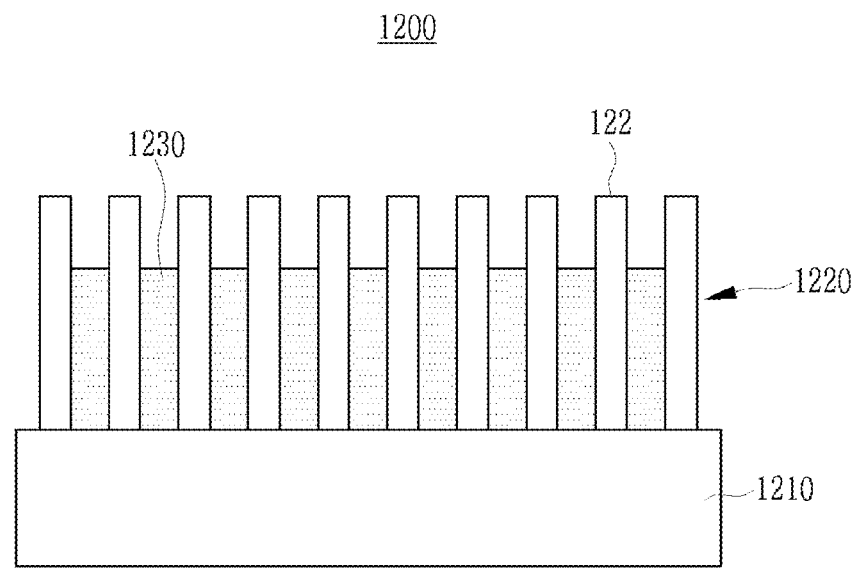

According to an exemplary embodiment of the present invention, as illustrated in FIG. 20, there may be provided a transparent conductor 1200 including a transparent substrate 1210, a nanostructure portion 1220 formed on the transparent substrate, the nanostructure portion 120 including a plurality of nanopillars 122, and a transparent conductive portion 1230 formed on the transparent substrate on which the nanostructure portion is formed. In the transparent conductor 1200, a height of the nanostructure portion 1220 may be relatively greater than a height of the transparent conductive portion 1230.

Figure 21:
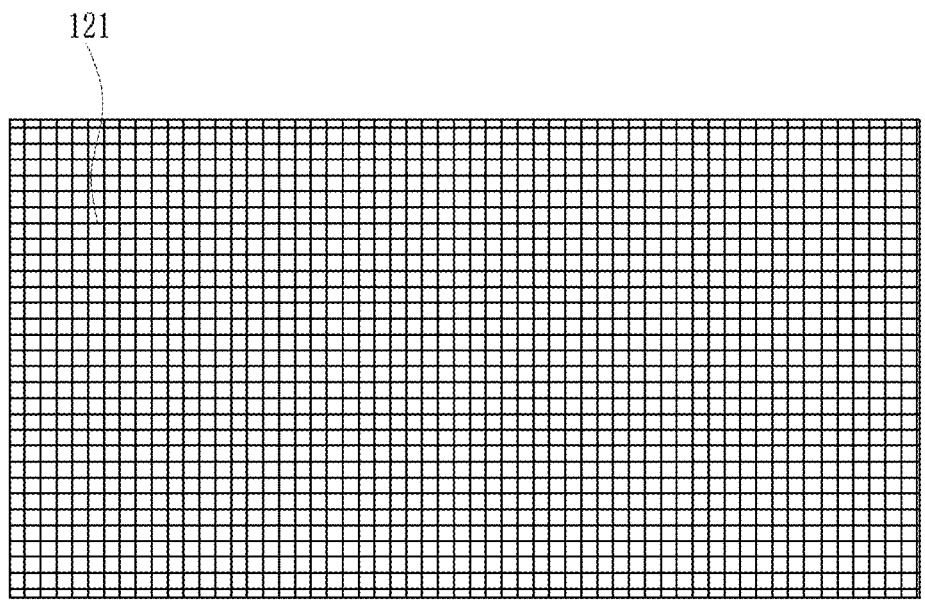

In a transparent conductor according to an exemplary embodiment of the present invention, referring to FIG. 21 which is a plan view from above, a transparent window 121 may be formed inside a transparent conductive portion due to a nanostructure portion passing through the inside of the transparent conductive portion, thereby improving light transmittance of the conductor.

According to an exemplary embodiment, a transparent conductive portion may be formed by entirely sintering the transparent conductive layer. Accordingly, the transparent conductive portion may be entirely formed on a substrate, and a transparent window caused by a plurality of nanopillars may be formed on an entire area of the transparent conductive portion on the substrate.

Figure 24:
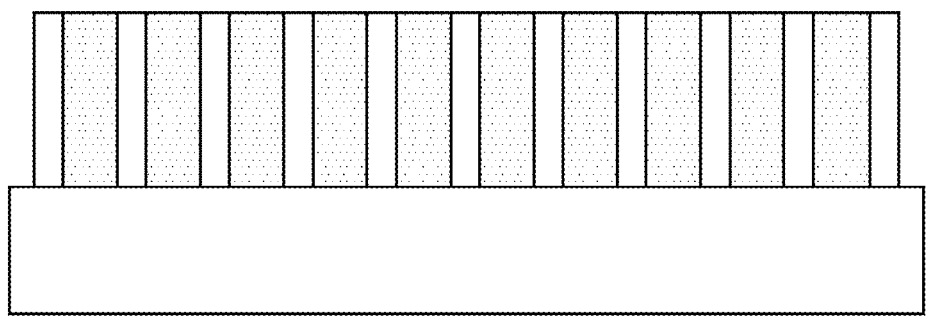

According to an exemplary embodiment, referring to FIG. 24, a height of a nanostructure portion may be equal to a height of a transparent conductive portion. In this case, a plurality of nanopillars included in the nanostructure portion may be selectively etched to have a height equal to a height of an upper surface of the transparent conductive portion through the above-described predetermined etching process.

According to an exemplary embodiment, a conductive layer coated on a transparent conductive portion may be further included. In a transparent conductor according to the present invention, a conductive layer may not be properly coated on a nanostructure portion including a plurality of nanopillars due to a poor superhydrophobic or wettability of the plurality of nanopillars. Accordingly, it is possible to selectively coat the conductive layer only on the transparent conductive portion, thereby improving light transmittance of the conductor, and more practically and efficiently manufacturing the conductor.

Figure 25:
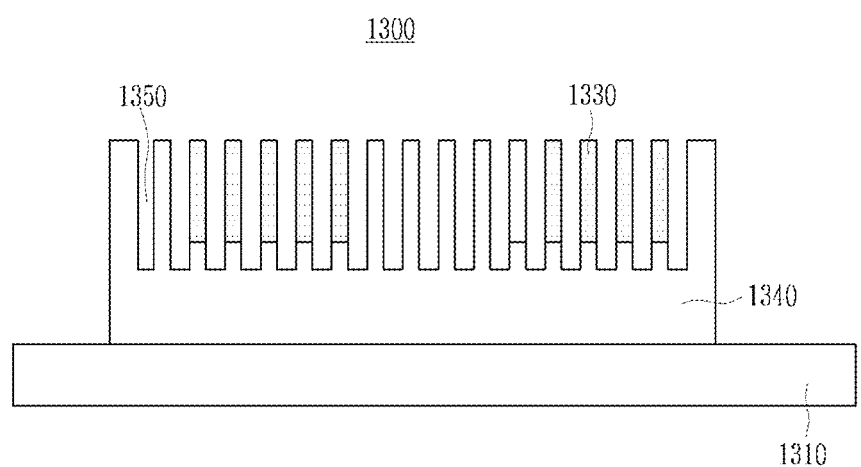
Figure 26:
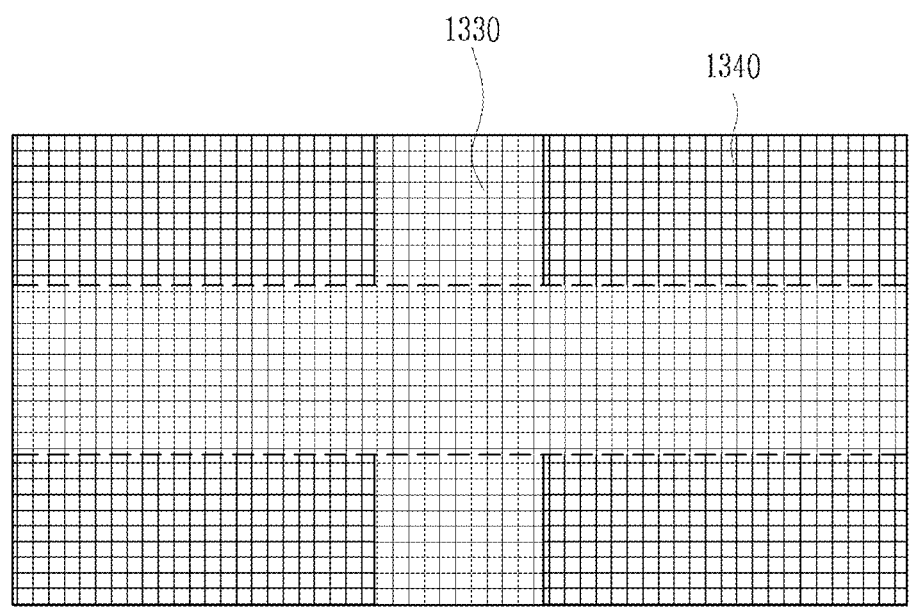

According to an exemplary embodiment of the present invention, as illustrated in FIG. 25, there may be provided a transparent conductor 1300 including a transparent substrate 1310, a transparent transfer layer 1340 formed on the transparent substrate, and a transparent conductive pattern portion 1330 on an upper portion of the transparent transfer layer, wherein the transparent transfer layer 1340 and the transparent conductive pattern portion 1330 include a plurality of nanoholes 1350. Referring to FIG. 26 which is a plan view from above, in a transparent conductor according to an exemplary embodiment of the present invention, a plurality of nanoholes may be formed not only in a transparent conductive pattern portion but also in a region of a transparent transfer layer where the transparent conductive pattern portion is not formed. In addition, due to a porous structure caused by the plurality of nanoholes, a surface area of the entire conductor may be increased, and light transmittance may be also greatly improved.

Figure 29:
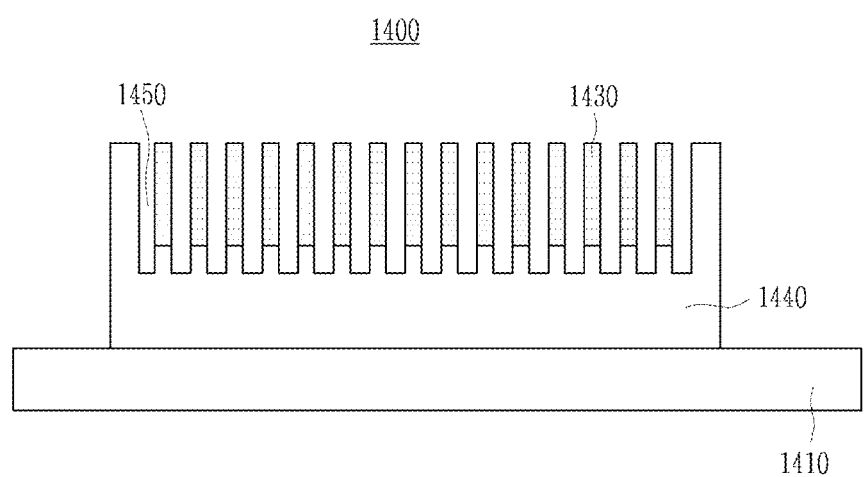

In addition, as illustrated in FIG. 29, there may be provided a transparent conductor 1400 including a transparent substrate 1410, a transparent transfer layer 1440 formed on the transparent substrate, and a transparent conductive portion 1430 on an upper portion of the transparent transfer layer, wherein the transparent transfer layer 1440 and the transparent conductive portion 1430 include a plurality of nanoholes 1450. In a transparent conductor according to an exemplary embodiment of the present invention, a plurality of nanoholes may be formed on an entire area of a transparent conductive portion. In addition, due to a porous structure caused by the plurality of nanoholes, a surface area of the entire conductor may be increased, and light transmittance may be also greatly improved.

According to an exemplary embodiment, the plurality of nanoholes may have a circular shape or a polygonal columnar shape or polygonal pyramidal shape having an arbitrary polygonal cross-section such as a triangle, a quadrangle, a pentagon, a hexagon, or the like, but are not limited thereto. The plurality of nanoholes may be uniformly formed over the transparent transfer layer and the entire upper surface of the transparent conductive pattern portion or transparent conductive portion, and may be disposed in a plurality of rows and a plurality of columns.

According to an exemplary embodiment, each nanohole may have a nano size. For example, each nanohole may have a diameter (D) of about 10 nm to about 100 nm, and a center-to-center distance (L) between two adjacent nanoholes may be about 30 nm to about 300 nm.

Figure 27:
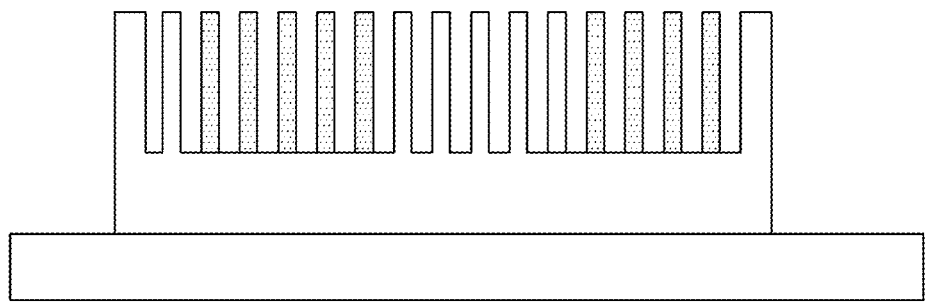
Figure 28:
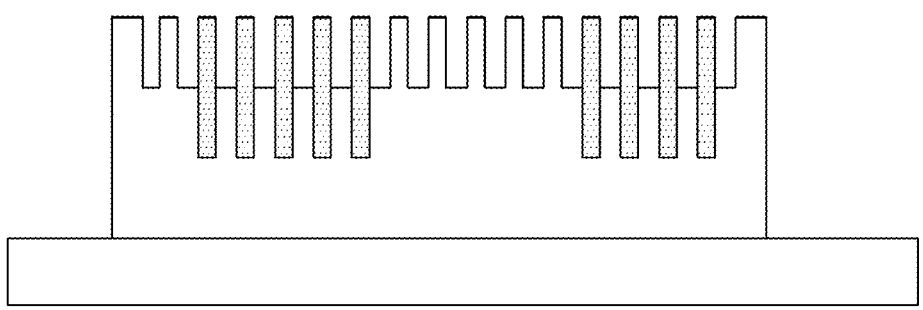

According to an exemplary embodiment, each nanohole may have a depth of about 100 nm to about 1000 nm, but it is possible to adjust the depth of each nanohole according to an electrical characteristic requirement of an application device. That is, the depth of each nanohole may be formed to be greater than a height (thickness) of a transparent conductive pattern portion or a transparent conductive portion (see FIGS. 25 and 29), but may be formed to be equal to the height of the transparent conductive pattern portion or the transparent conductive portion, as necessary (see FIG. 27), or may be formed to be less than the height of the transparent conductive pattern portion or the transparent conductive portion (see FIG. 28).

According to an exemplary embodiment, a transparent transfer layer may be formed by allowing a transparent transfer material to be coated on or attached to a surface of a substrate to be transferred (transfer target substrate), and transferring the transparent transfer material onto the substrate on which a transparent conductive pattern portion or a transparent conductive portion is formed. The transfer target substrate may be a transparent substrate. There is no limitation to a transfer method, and a publicly known transfer method and laminating method may be used.

According to an exemplary embodiment, the transparent transfer layer formed on a transfer target substrate may be transferred to an upper surface of a substrate on which a nanostructure portion including a plurality of nanopillars and a transparent conductive pattern portion or a transparent conductive portion are formed. In this case, the transparent conductive pattern portion or the transparent conductive portion may be transferred to the transfer target substrate, and the nanostructure portion may pass through the transparent transfer layer of the transfer target substrate to form a nanohole, and thus a plurality of nanoholes corresponding to the plurality of nanopillars included in the nanostructure portion may be formed. The substrate including the nanostructure portion may be separated.

According to an exemplary embodiment, a conductive layer coated on a transparent conductor may be further included. The transparent conductor according to the present invention may increase an area of a photoactive layer by coating the conductive layer on a plurality of nanoholes and the transparent conductor to prevent quenching of an exciton, and may facilitate a movement of a charge and/or exciton and a flow of energy to implement a device having high efficiency and a long lifespan.

According to an exemplary embodiment, there may be provided various devices including a transparent conductor according to an exemplary embodiment of the present invention. The transparent conductor according to an exemplary embodiment of the present invention may be employed as transparent electrodes of various electronic devices.

Manufacturing Method of Transparent Conductor (Second Exemplary Embodiment)

Figure 31:
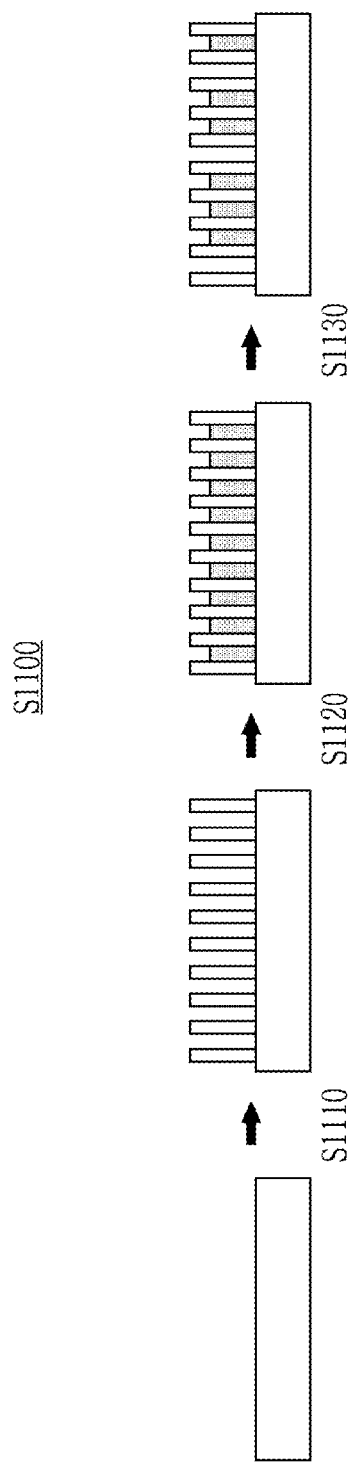
FIGS. 31 to 40 are diagrams schematically illustrating a manufacturing method of a transparent conductor according to another exemplary embodiment of the present invention.

Referring to FIG. 31, a manufacturing method of a transparent conductor (S1100) according to an exemplary embodiment of the present invention may include forming a nanostructure portion including a plurality of nanopillars on a first substrate (operation S1110), coating a transparent conductive layer on the first substrate on which the nanostructure portion is formed (operation S1120), and forming a transparent conductive pattern portion by selectively patterning the transparent conductive layer (operation S1130). A height of the nanostructure portion may be greater than a height of the transparent conductive pattern portion. According to an exemplary embodiment, the transparent conductor 1100 according to an exemplary embodiment of the present invention may be manufactured through the manufacturing method (operation S1100).

In operation S1120, the transparent conductive layer may be coated up to a height relatively less than a height of an upper surface of the nanostructure portion formed on a substrate. According to an exemplary embodiment, the plurality of nanopillars included in the nanostructure portion may be formed to pass through the inside of the transparent conductive pattern portion, and thus a transparent window may be formed inside the transparent conductive pattern portion.

In operation S1130, the transparent conductive pattern portion may be formed by selectively patterning the transparent conductive layer coated on the first substrate on which the nanostructure portion is formed. Accordingly, a transparent region caused by the plurality of nanopillars may be formed even in a region where the transparent conductive pattern portion is not formed on the substrate, thereby improving light transmittance of the conductor.

According to an exemplary embodiment, a manufacturing method of a transparent conductor may further include, after operation S1130, coating a conductive layer on the transparent conductive pattern portion. The conductive layer may function as a photoactive layer, and thus photocharged particles generated by light may be efficiently converted into electrical energy, and resultantly a high-efficiency conductor may be formed.

Figure 32:
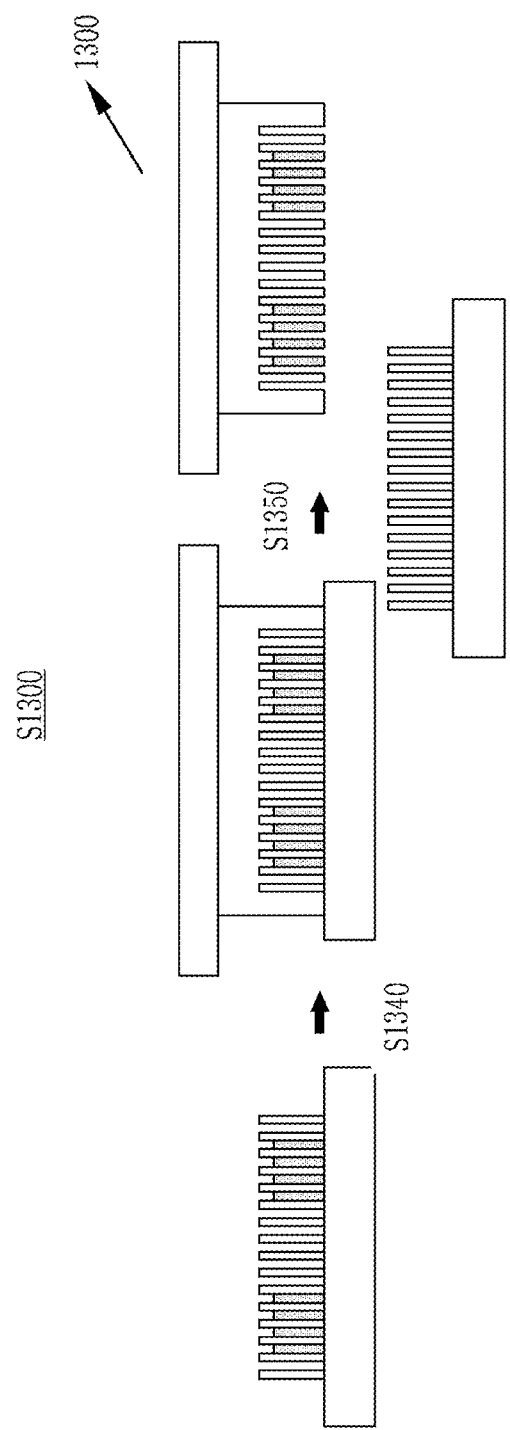

According to an exemplary embodiment, referring to FIG. 32, a manufacturing method of a transparent conductor (S1300) may include, after operation S1130, placing a second substrate including a transparent transfer layer on the first substrate, and then transferring the transparent transfer layer onto the first substrate on which the transparent conductive pattern portion is formed (operation S1340), and separating the first substrate (operation S1350). According to an exemplary embodiment, the transparent conductor 1300 according to an exemplary embodiment of the present invention may be manufactured through the manufacturing method (S1300).

According to an exemplary embodiment, a material of the first substrate is not limited, but the second substrate is preferably made of a transparent material, and the second substrate may be a transfer target substrate.

Figure 33:
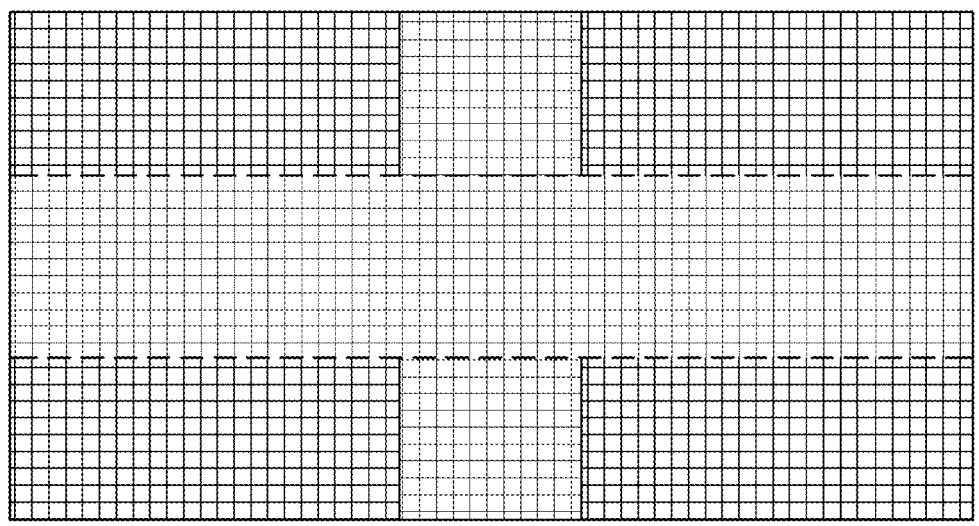

In operation S1340, the transparent transfer layer formed on the transfer target substrate may be transferred to an upper surface of a substrate on which a nanostructure portion including the plurality of nanopillars and the transparent conductive pattern portion are formed. Referring to FIG. 33 which is a plan view from above, the transparent conductive pattern portion may be transferred to the transfer target substrate, and the nanostructure portion may pass through the transparent transfer layer of the transfer target substrate to form a nanohole, and thus a plurality of nanoholes corresponding to the plurality of nanopillars included in the nanostructure portion may be formed. Depths of the plurality of nanoholes may be formed to be greater than a height (thickness) of the transparent conductive pattern.

In operation S1350, the nanostructure portion including the plurality of nanopillars may be separated together with the first substrate.

According to an exemplary embodiment, a manufacturing method of a transparent conductor may further include, after operation S1350, coating a conductive layer on the transparent conductor. The conductive layer may function as a photoactive layer, and thus photocharged particles generated by light may be efficiently converted into electrical energy, and resultantly a high-efficiency conductor may be formed.

Figure 34:
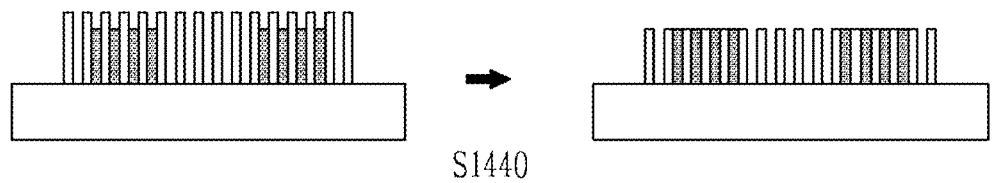

According to an exemplary embodiment, referring to FIG. 34, a manufacturing method of a transparent conductor (S1400) may further include, after operation S1130, etching the nanostructure portion so that a height of the nanostructure portion is equal to a height of the transparent conductive pattern portion (operation S1440).

In operation S1440, each of a plurality of nanopillars included in the nanostructure portion may be etched through a predetermined method up to a height of an upper surface of the transparent conductive pattern portion, and thus the upper surface of the transparent conductive pattern portion may have a height equal to a height of an upper surface of the nanostructure portion.

According to an exemplary embodiment, a manufacturing method of a transparent conductor may further include, after operation S1440, coating a conductive layer on the transparent conductor.

Figure 35:
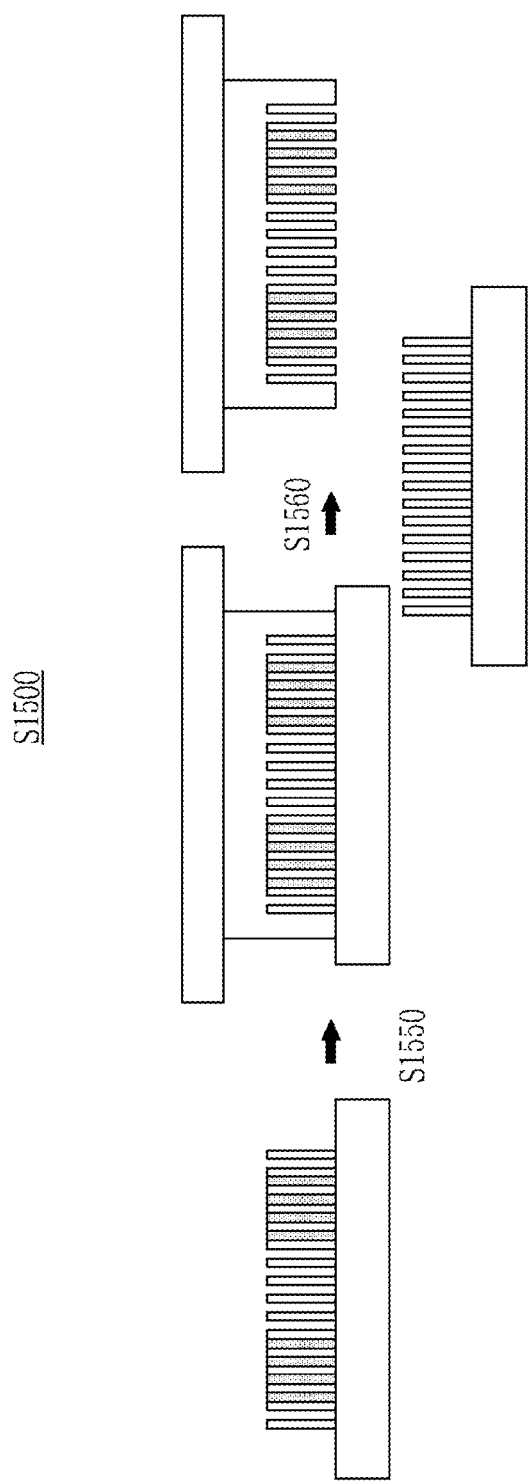

According to an exemplary embodiment, referring to FIG. 35, a manufacturing method of a transparent conductor (S1500) may further include, after operation S1440, placing a second substrate including a transparent transfer layer on the first substrate, and then transferring the transparent transfer layer onto the first substrate on which the transparent conductive pattern portion is formed (operation S1550), and separating the first substrate (operation S1560).

A material of the first substrate is not limited, but the second substrate is preferably made of a transparent material. The second substrate may be a transfer target substrate, and the transparent transfer layer formed on the transfer target substrate may be transferred onto a substrate on which the plurality of nanopillars and the transparent conductive pattern portion are formed to form a plurality of nanoholes corresponding to the plurality of nanopillars, and depths of the plurality of nanoholes may be formed to be equal to a height (thickness) of the transparent conductive pattern portion.

According to an exemplary embodiment, a manufacturing method of a transparent conductor may further include, after operation S1560, coating a conductive layer on the transparent conductor.

Figure 36:
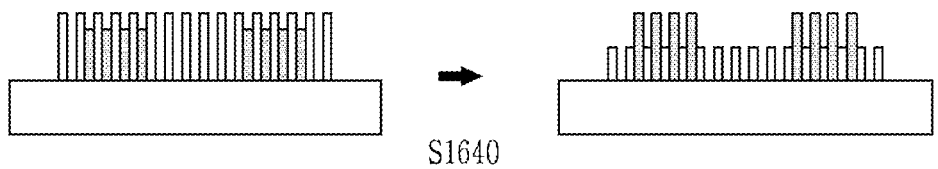

According to an exemplary embodiment, referring to FIG. 36, a manufacturing method of a transparent conductor (S1600) may further include, after operation S1130, etching the nanostructure portion so that a height of the nanostructure portion is less than a height of the transparent conductive pattern portion (operation S1640).

In operation S1640, each of a plurality of nanopillars included in the nanostructure portion may be etched up to a position at a height relatively less than a height of an upper surface of the transparent conductive pattern portion through a predetermined method to expose the transparent conductive pattern portion above the nanostructure portion. A height of the etched nanopillar is not limited, but the nanopillar may be preferably etched to have a height of ½ to 9/10 of the height of the transparent conductive pattern portion. When the height of the nanopillar is less than ½ of the height of the transparent conductive pattern portion, the nanopillar may be provided on a substrate to reduce an effect of supporting the transparent conductive pattern portion.

According to an exemplary embodiment, a manufacturing method of a transparent conductor may further include, after operation S1640, coating a conductive layer on the transparent conductor.

Figure 37:
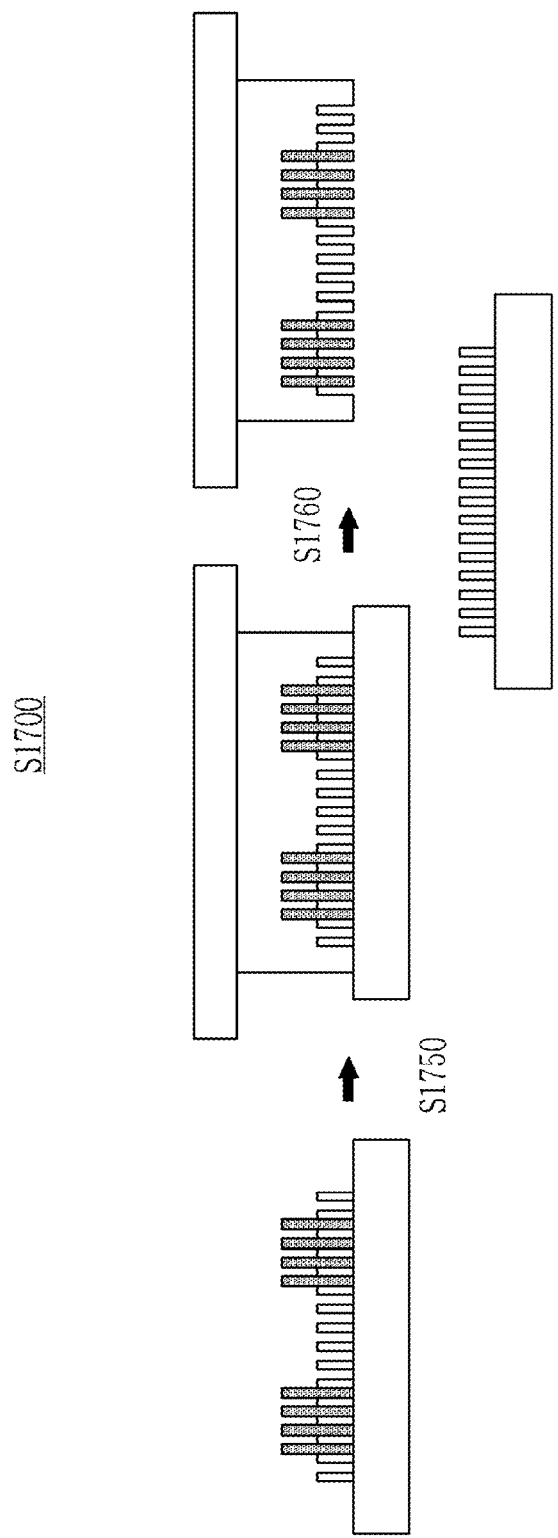

According to an exemplary embodiment, referring to FIG. 37, a manufacturing method of a transparent conductor (S1700) may further include, after operation S1640, placing a second substrate including a transparent transfer layer on the first substrate, and then transferring the transparent transfer layer onto the first substrate on which the transparent conductive pattern portion is formed (operation S1750), and separating the first substrate (operation S1760).

A material of the first substrate is not limited, but the second substrate is preferably made of a transparent material. The second substrate may be a transfer target substrate, and the transparent transfer layer formed on the transfer target substrate may be transferred onto a substrate on which the plurality of nanopillars and the transparent conductive pattern portion are formed to form a plurality of nanoholes corresponding to the plurality of nanopillars, and depths of the plurality of nanoholes may be formed to be less than a height (thickness) of the transparent conductive pattern.

According to an exemplary embodiment, a manufacturing method of a transparent conductor may further include, after operation S1760, coating a conductive layer on the transparent conductor.

Figure 38:
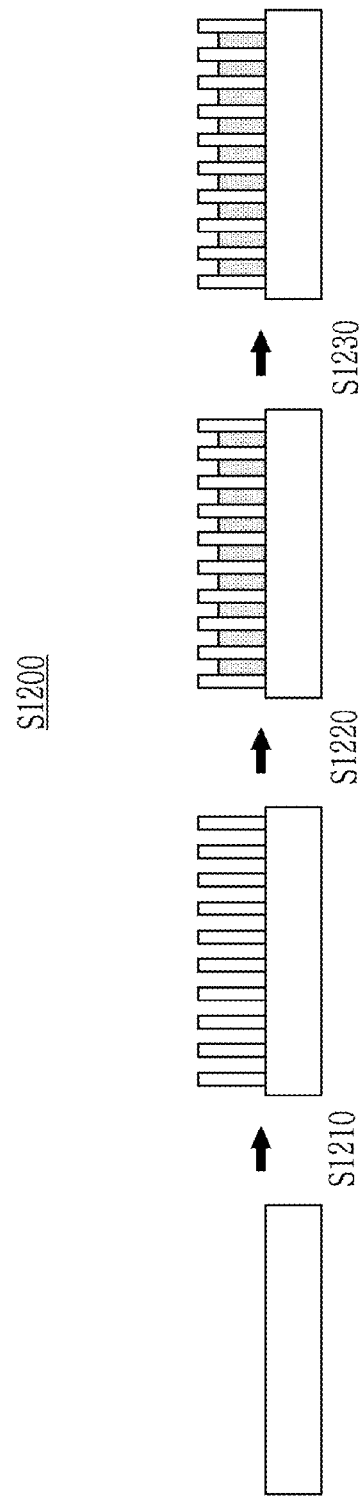

Referring to FIG. 38, a manufacturing method of a transparent conductor (S1200) according to an exemplary embodiment of the present invention may include forming a nanostructure portion including a plurality of nanopillars on a first substrate (operation S1210), coating a transparent conductive layer on the first substrate on which the nanostructure portion is formed (operation S1220), and forming a transparent conductive portion by sintering the transparent conductive layer (operation S1230). A height of the nanostructure portion may be greater than a height of the transparent conductive portion. According to an exemplary embodiment, the transparent conductor 1200 according to an exemplary embodiment of the present invention may be manufactured through the manufacturing method (S1200).

In operation S1230, the transparent conductive layer may be entirely sintered on the first substrate on which the nanostructure portion is formed to form the transparent conductive portion. According to an exemplary embodiment, the transparent conductive portion may be entirely formed on the first substrate, and a transparent window caused by the plurality of nanopillars may be formed on an entire area of the transparent conductive portion on a substrate.

According to an exemplary embodiment, a manufacturing method of a transparent conductor may further include, after operation S1230, coating a conductive layer on the transparent conductive portion.

Figure 39:
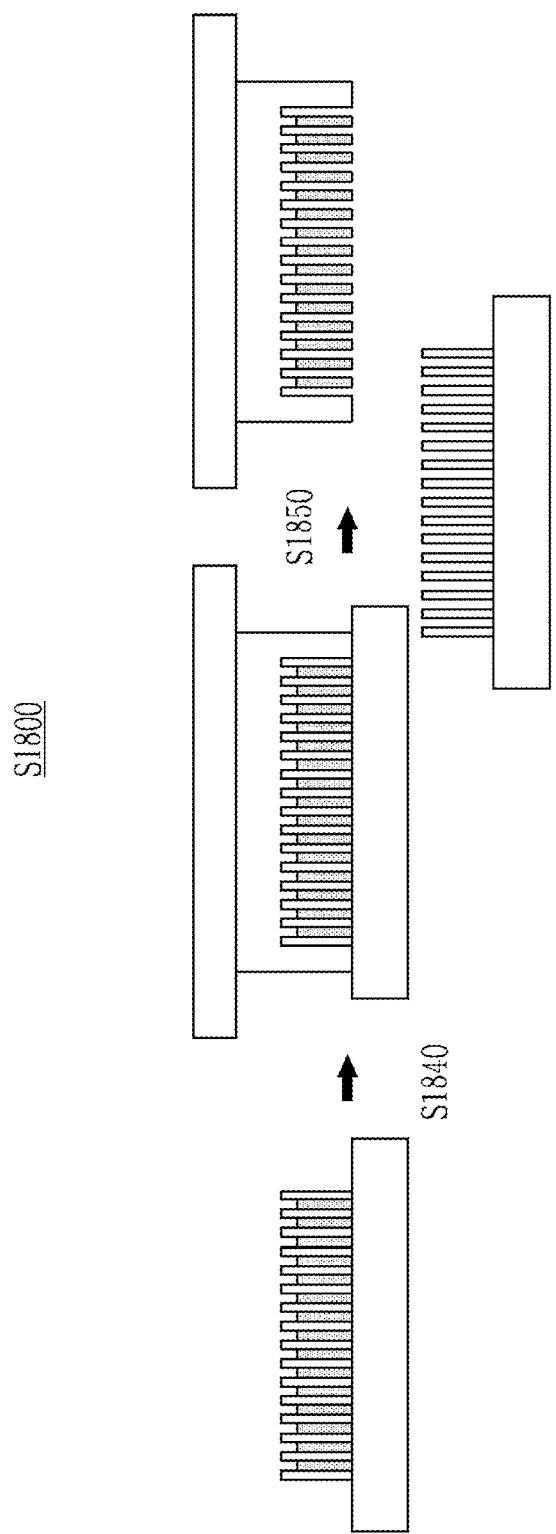

According to an exemplary embodiment, referring to FIG. 39, a manufacturing method of a transparent conductor (S1800) may further include, after operation S1230, placing a second substrate including a transparent transfer layer on the first substrate, and then transferring the transparent transfer layer onto the first substrate on which the transparent conductive portion is formed (operation S1840), and separating the first substrate (operation S1850).

In operation S1840, the transparent transfer layer formed on the transfer target substrate may be transferred to the upper surface of the substrate on which the nanostructure portion including the plurality of nanopillars and the transparent conductive portion are formed. In this case, the transparent conductive portion may be transferred to the transfer target substrate, and the nanostructure portion may pass through the transparent transfer layer of the transfer target substrate to form a nanohole, and thus a plurality of nanoholes corresponding to the plurality of nanopillars included in the nanostructure portion may be formed.

Depths of the plurality of nanoholes may be formed to be greater than a height (thickness) of the transparent conductive portion.

In operation S1850, the nanostructure portion including the plurality of nanopillars is separated together with the first substrate.

According to an exemplary embodiment, a manufacturing method of a transparent conductor may further include, after operation S1850, coating a conductive layer on the transparent conductor. The conductive layer may function as a photoactive layer, and thus photocharged particles generated by light may be efficiently converted into electrical energy, and resultantly a high-efficiency conductor may be formed.

Figure 40:

According to an exemplary embodiment, referring to FIG. 40, a manufacturing method of a transparent conductor (S1900) may further include, after operation S1230, etching the nanostructure portion so that a height of the nanostructure portion is equal to a height of the transparent conductive portion (operation S1940).

In operation S1940, each of a plurality of nanopillars included in the nanostructure portion may be etched up to a height of an upper surface of the transparent conductive portion through a predetermined method, and thus the upper surface of the transparent conductive pattern portion may have a height equal to a height of an upper surface of the nanostructure portion.

According to an exemplary embodiment, a manufacturing method of a transparent conductor may further include, after operation S1940, coating a conductive layer on the transparent conductor.

According to an exemplary embodiment, there may be provided various devices including a transparent conductor manufactured by a manufacturing method according to an exemplary embodiment of the present invention. The transparent conductor manufactured by the manufacturing method according to an exemplary embodiment of the present invention may be employed as transparent electrodes of various electronic devices.

A number of exemplary embodiments have been described above. Nevertheless, it should be understood that various modifications may be made to these exemplary embodiments. For example, suitable results may be achieved if the described techniques are performed in a different order and/or if constituent elements in a described system, architecture, device, or circuit are combined in a different manner and/or replaced or supplemented by other constituent elements or their equivalents. Therefore, other implementations, other exemplary embodiments, and equivalents to the claims are also within the scope of the following claims.

The invention claimed is:

1. A transparent conductor comprising:
   a transparent substrate;
   a transparent conductive pattern formed on the transparent substrate; and
   a transparent transfer layer formed on the transparent substrate,
   wherein the transparent conductive pattern is formed on the transparent transfer layer, and
   the transparent conductive pattern comprises a nanostructure on an upper surface thereof.

2. The transparent conductor of claim 1, wherein:
   the transparent conductive pattern is embedded in an upper portion of the transparent transfer layer, and
   the transparent conductor comprises a nanostructure on an upper surface of the transparent transfer layer.

3. The transparent conductor of claim 1, further comprising:
   a conductive layer coated on an upper surface of the transparent transfer layer or an upper surface of the transparent conductive pattern.

* * * * *